United States Patent
Kim et al.

(10) Patent No.: US 9,608,699 B2
(45) Date of Patent: Mar. 28, 2017

(54) METHOD AND DEVICE FOR TRANSMITTING CHANNEL STATE INFORMATION IN WIRELESS COMMUNICATION SYSTEM

(71) Applicant: LG ELECTRONICS INC., Seoul (KR)

(72) Inventors: Eunsun Kim, Anyang-si (KR); Illsoo Sohn, Anyang-si (KR); Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/383,472

(22) PCT Filed: Mar. 6, 2013

(86) PCT No.: PCT/KR2013/001804
§ 371 (c)(1),
(2) Date: Sep. 5, 2014

(87) PCT Pub. No.: WO2013/133626
PCT Pub. Date: Sep. 12, 2013

(65) Prior Publication Data
US 2015/0043469 A1 Feb. 12, 2015

Related U.S. Application Data

(60) Provisional application No. 61/607,533, filed on Mar. 6, 2012, provisional application No. 61/609,931, filed on
(Continued)

(51) Int. Cl.
*H04B 7/02* (2006.01)
*H04B 7/26* (2006.01)
*H04L 5/00* (2006.01)

(52) U.S. Cl.
CPC ............... *H04B 7/024* (2013.01); *H04B 7/26* (2013.01); *H04L 5/005* (2013.01); *H04L 5/0035* (2013.01); *H04L 5/0053* (2013.01)

(58) Field of Classification Search
None
See application file for complete search history.

(56) References Cited

U.S. PATENT DOCUMENTS

| 2011/0244877 A1 | 10/2011 | Farajidana et al. |
| 2012/0002596 A1 | 1/2012 | Kim et al. |

(Continued)

FOREIGN PATENT DOCUMENTS

| KR | 10-2010-0106251 | 10/2010 |
| KR | 10-2010-0117522 | 11/2010 |

(Continued)

OTHER PUBLICATIONS

Provisional U.S. Appl. No. 61/557,260 SPEC Nov. 8, 2011; Yoo et, all; US Provisional Application, Nov. 8, 2011*
(Continued)

*Primary Examiner* — Hassan Kizou
*Assistant Examiner* — Deepa Belur
(74) *Attorney, Agent, or Firm* — Lee Hong Degerman Kang Waimey

(57) ABSTRACT

One embodiment of the present invention discloses a method for allowing a terminal to transmit channel state information (CSI) in a wireless communication system in which a plurality of CSI reference signal (CSI-RS) resources are set for a plurality of transmission points, and the method for transmitting the CSI comprises the steps of: determining CSI reference resources; and transmitting CSI calculated from a measured signal on the basis of the CSI reference resources, wherein the CSI reference resources are included in one of at least two CSI subframe sets, the CSI subframe
(Continued)

sets are set for each of the plurality of CSI-RS resources, and the CSI subframe sets are commonly set for transmission points which perform cooperative transmission among the plurality of transmission points.

5 Claims, 18 Drawing Sheets

Related U.S. Application Data on Mar. 12, 2012, provisional application No. 61/643,347, filed on May 7, 2012, provisional application No. 61/676,314, filed on Jul. 26, 2012.

(56) References Cited

U.S. PATENT DOCUMENTS

| | | | | |
|---|---|---|---|---|
| 2012/0176939 A1* | 7/2012 | Qu | ............ | H04L 5/0023 370/255 |
| 2013/0114455 A1* | 5/2013 | Yoo | ............ | H04W 24/00 370/252 |
| 2013/0196675 A1* | 8/2013 | Xiao | ............ | H04W 72/082 455/452.1 |
| 2013/0208604 A1* | 8/2013 | Lee | ............ | H04L 25/0226 370/252 |
| 2013/0258973 A1* | 10/2013 | Khoshnevis | ...... | H04W 72/1226 370/329 |
| 2013/0303090 A1* | 11/2013 | Hammarwall | ....... | H04B 7/0456 455/67.13 |
| 2014/0321407 A1* | 10/2014 | Seo | ............ | H04B 7/0626 370/329 |
| 2015/0009928 A1* | 1/2015 | Sohn | ............ | H04L 1/0026 370/329 |
| 2015/0049621 A1* | 2/2015 | Liu | ............ | H04L 5/0048 370/252 |
| 2015/0049702 A1* | 2/2015 | Cheng | ............ | H04B 7/024 370/329 |
| 2015/0280878 A1* | 10/2015 | Lee | ............ | H04L 5/0048 370/252 |

FOREIGN PATENT DOCUMENTS

| | | |
|---|---|---|
| KR | 10-2011-0083445 | 7/2011 |
| KR | 10-1053635 | 8/2011 |
| KR | 10-2012-0017432 | 2/2012 |

OTHER PUBLICATIONS

3rd Generation Partnership Project (3GPP), "Technical Specification Group Radio Access Network; Evolved Universal Terrestrial Radio Access (E-UTRA); Physical layer procedures (Release 10)," 3GPP TS 36.213 V10.4.0, Dec. 2011, 126 pages.
PCT International Application No. PCT/KR2013/001804, Written Opinion of the International Searching Authority dated Jun. 18, 2013, 1 page.
Korean Intellectual Property Office Application Serial No. 10-2014-7028044, Notice of Allowance dated Feb. 3, 2016, 3 pages.

* cited by examiner

FIG. 5
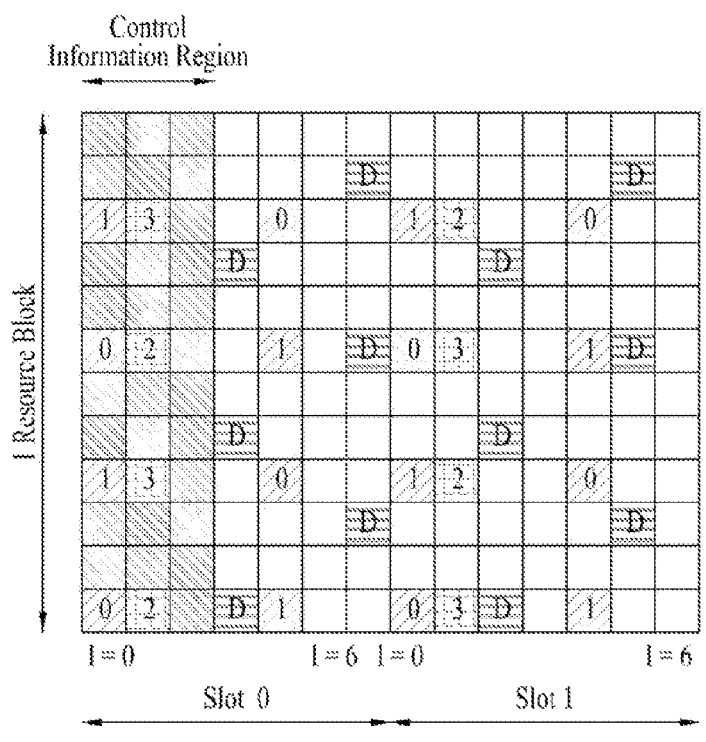
(a)
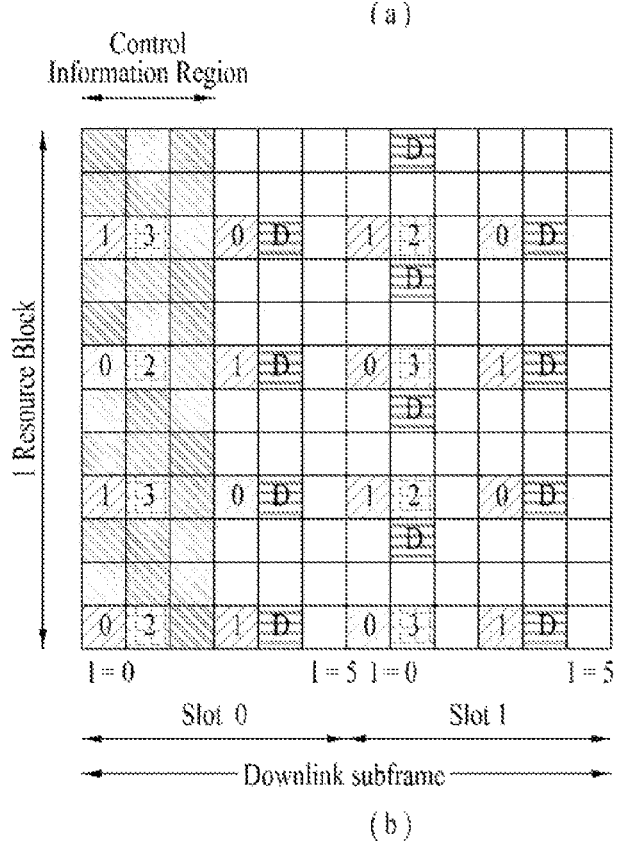
(b)

FIG. 6
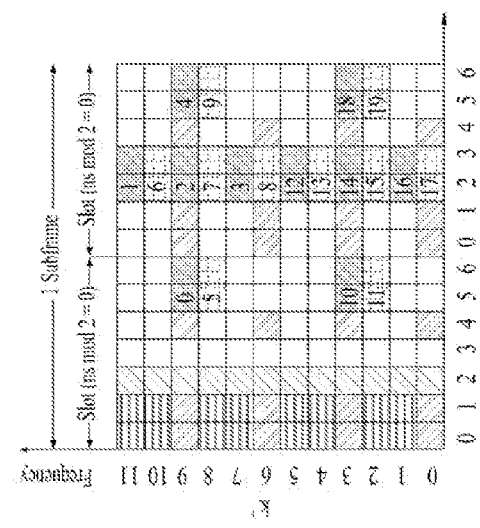
(a)
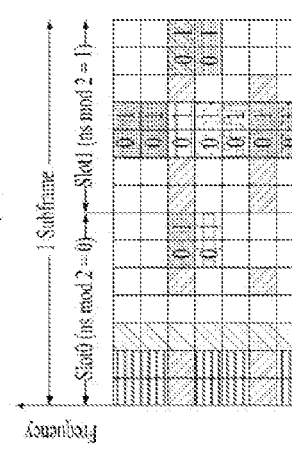
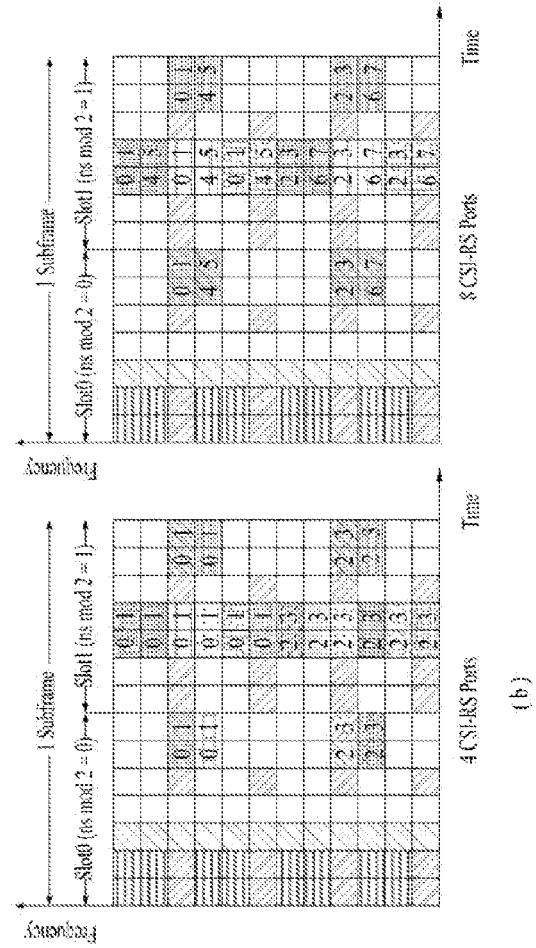
(b)

FIG. 14
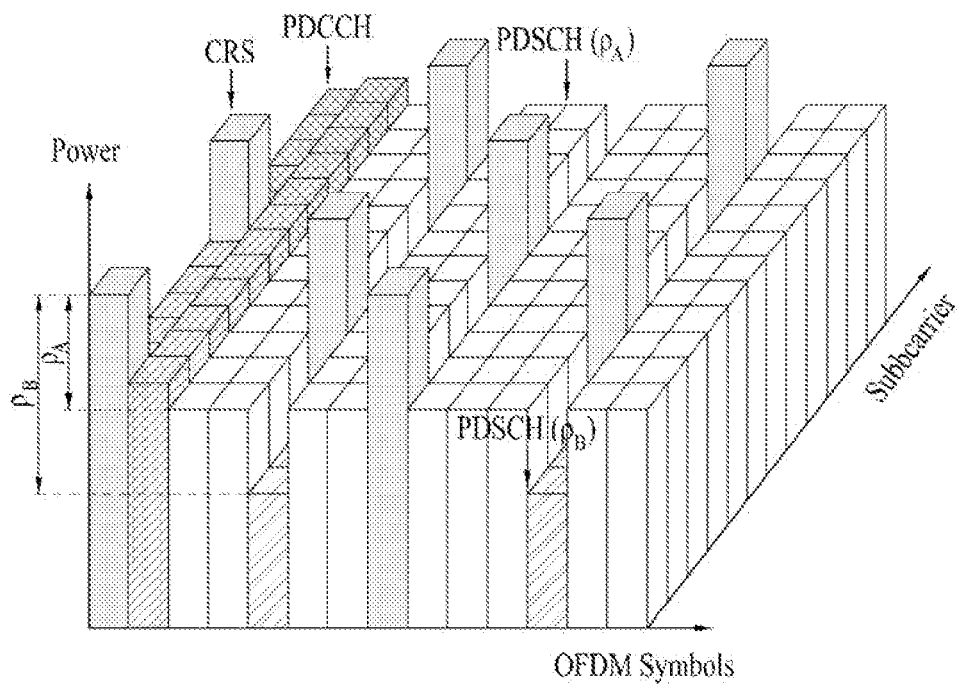
(a)
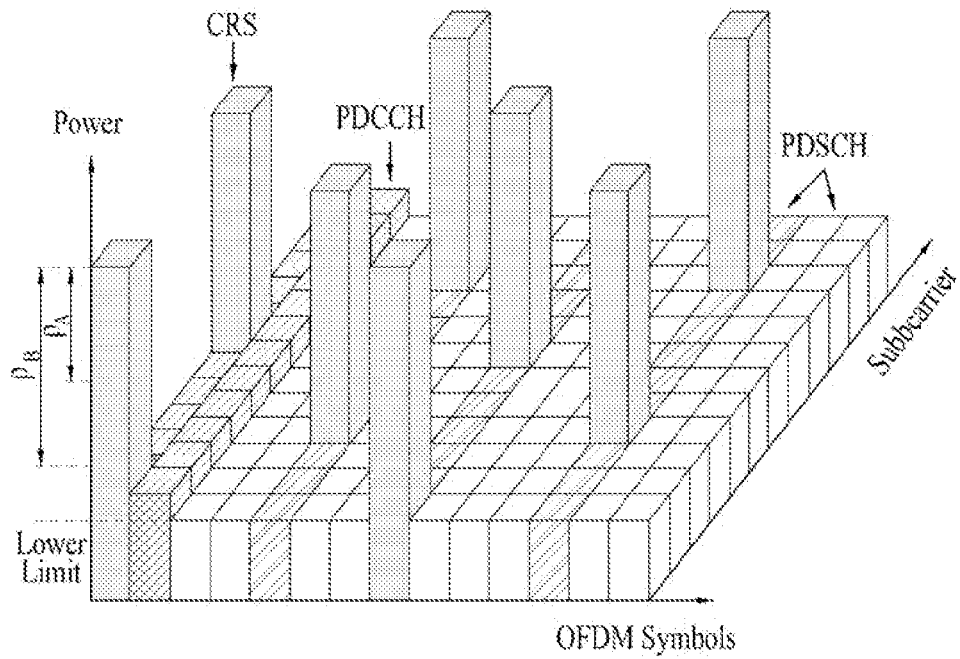
(b)

FIG. 16
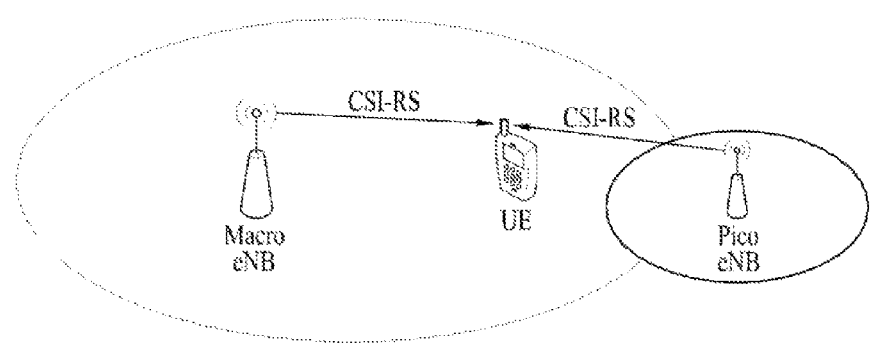
(a)
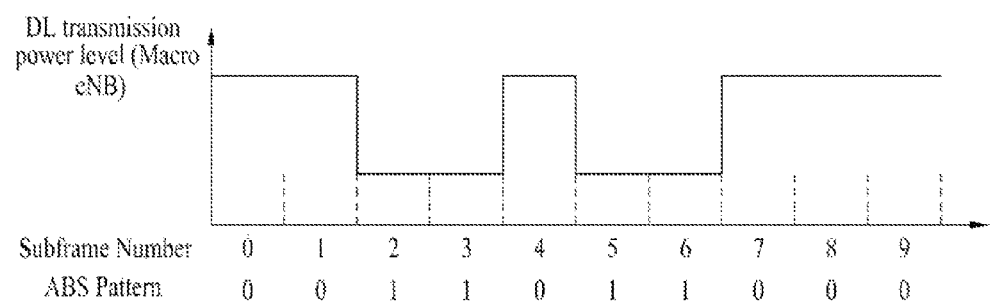
(b)

FIG. 17
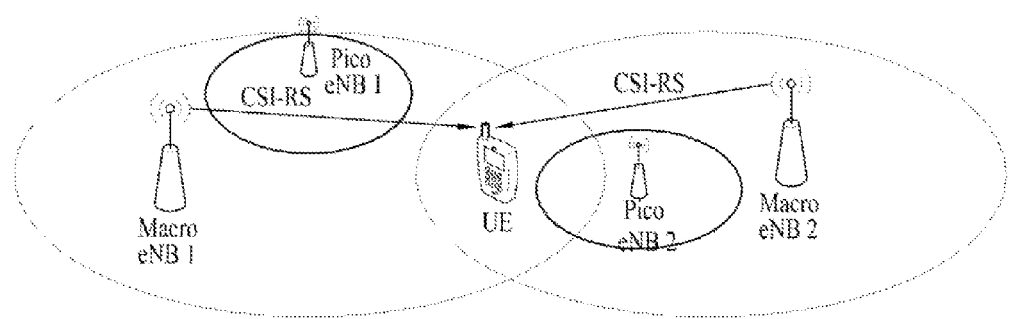
(a)
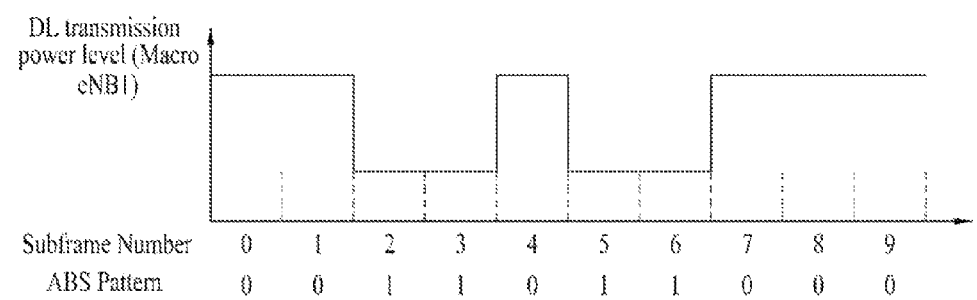
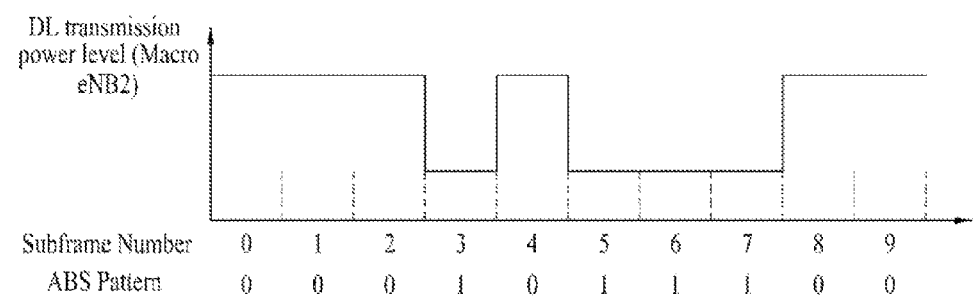
(b)

METHOD AND DEVICE FOR TRANSMITTING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2013/001804, filed on Mar. 6, 2013, which claims the benefit of U.S. Provisional Application Ser. Nos. 61/607,533, filed on Mar. 6, 2012, 61/609,931, filed on Mar. 12, 2012, 61/643,347, filed on May 7, 2012, and 61/676,314, filed on Jul. 26, 2012, the contents of which are all hereby incorporated by reference herein in their entirety.

TECHNICAL FIELD

The following descriptions relate to a wireless communication system and, more specifically, to a method and device for transmitting a channel state report.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) or Multi-Carrier Frequency Division Multiple Access (MC-FDMA).

DISCLOSURE

Technical Problem

The present invention discloses techniques related to a channel station information transmission method and the like applicable to cooperative transmission in transmission of a channel state report.

The technical problems solved by the present invention are not limited to the above technical problems and those skilled in the art may understand other technical problems from the following description.

Technical Solution

A first technical aspect of the present invention is a method for transmitting, by a UE, channel state information (CSI) in a wireless communication system in which a plurality of CSI-RS resources is set for a plurality of transmission points, the method including: determining CSI reference resources; and transmitting CSI calculated from a measured signal on the basis of the CSI reference resources, wherein the CSI reference resources are included in one of at least two CSI subframe sets, the CSI subframe sets are configured for each of the plurality of CSI-RS resources, and the CSI subframe sets are commonly configured for transmission points configured to perform cooperative transmission from among the plurality of transmission points.

A second technical aspect of the present invention is a UE in a wireless communication system in which a plurality of CSI-RS resources is set, including: a transmission module; and a processor, wherein the processor is configured to determine CSI reference resources and to transmit CSI calculated from a measured signal on the basis of the CSI reference resources, wherein the CSI reference resources are included in one of at least two CSI subframe sets, the CSI subframe sets are configured for each of the CSI-RS resources, and the CSI subframe sets are commonly configured for transmission points configured to perform cooperative transmission from among a plurality of transmission points.

The first and second technical aspects may have the following.

The resources for signal measurement may be indicated by a non-zero power CSI-RS configuration.

The CSI reference resources may correspond to specific subframe in the time domain.

The CSI subframe may be configured by higher layer signaling.

The CSI is periodically transmitted through a physical uplink control channel.

The at least two CSI subframe sets may be determined on the basis of an almost blank subframe (ABS) of a transmission point related to the UE.

A third aspect of the present invention is a method for receiving, by a transmission point, CSI in a wireless communication system in which a plurality of CSI-RS resources is set, the method including: receiving CSI calculated from a measured signal on the basis of CSI reference resources, from a UE, wherein the CSI reference resources are included in one of at least two CSI subframe sets, the CSI subframe sets are configured for each of the plurality of CSI-RS resources, and the CSI subframe sets are commonly configured for transmission points configured to perform cooperative transmission from among a plurality of transmission points.

A fourth aspect of the present invention is a transmission point in a wireless communication system in which a plurality of CSI-RS resources is set, including: a transmission module; and a processor, wherein the processor is configured to receive CSI calculated from a measured signal on the basis of CSI reference resources, from a UE, wherein the CSI reference resources are included in one of at least two CSI subframe sets, the CSI subframe sets are configured for each of the CSI-RS resources, and the CSI subframe sets are commonly configured for transmission points configured to perform cooperative transmission from among a plurality of transmission points.

The third and fourth technical aspects may have the following.

The resources for signal measurement may be indicated by a non-zero power CSI-RS configuration.

The CSI reference resources may correspond to specific subframe in the time domain.

The CSI subframe may be configured by higher layer signaling.

The CSI is periodically transmitted through a physical uplink control channel.

The at least two CSI subframe sets may be determined on the basis of an almost blank subframe (ABS) of a transmission point related to the UE.

Advantageous Effects

According to the present invention, it is possible to efficiently support channel state reporting according to application of inter-cell interference coordination in a cooperative transmission environment in which restricted measurement is set.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a reference signal;

FIG. 6 illustrates a channel state information reference signal;

FIGS. 14 to 17 illustrate a relationship between a channel state information configuration and a power ratio according to an embodiment of the present invention.

BEST MODE

Figure 1:
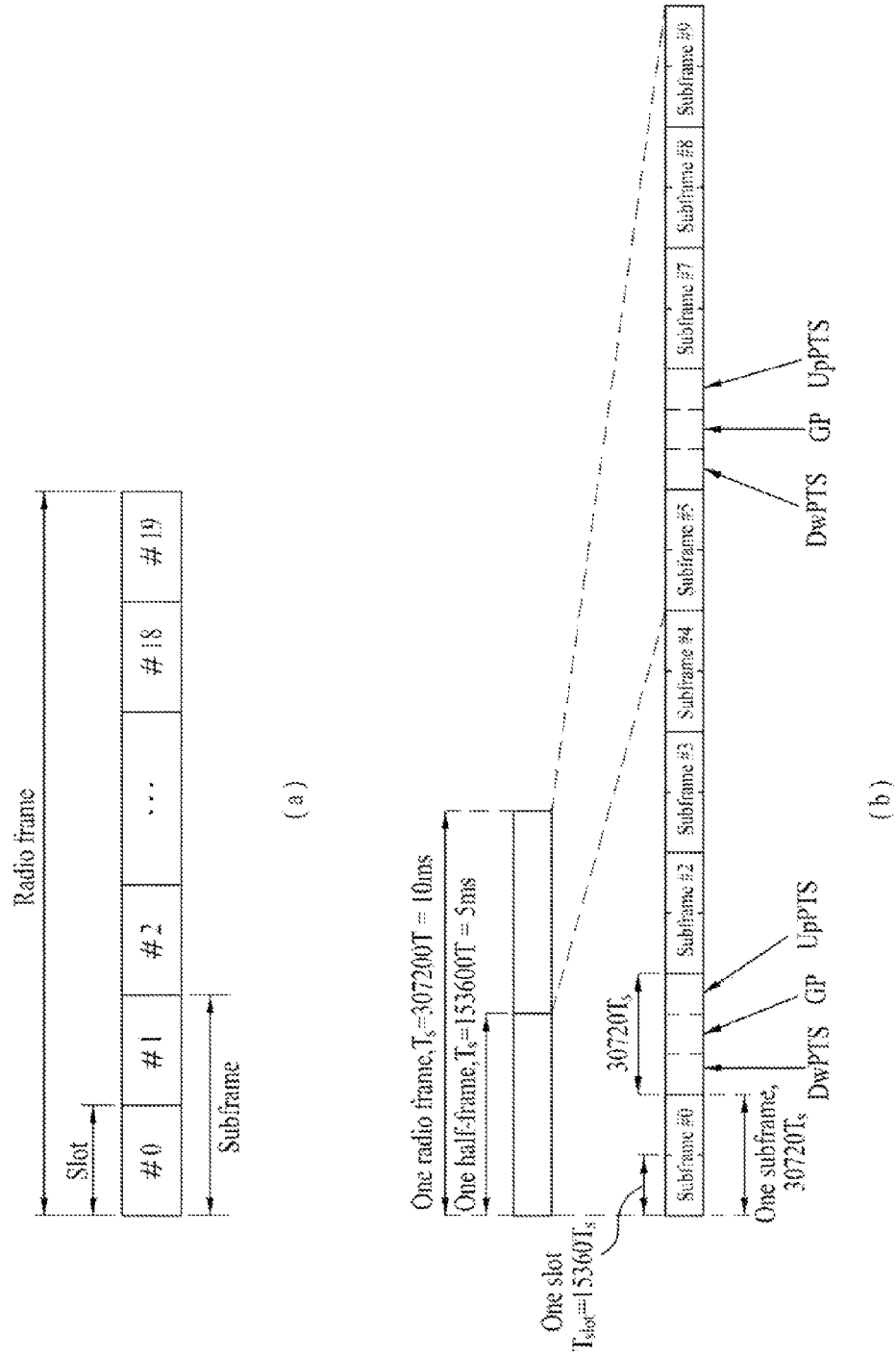
FIG. 1 illustrates a radio frame structure.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A downlink radio frame structure will now be described with reference to FIG. 1.

In a cellular OFDM radio packet communication system, uplink/downlink data packet transmission is performed subframe by subframe. A subframe is defined as a predetermined time interval including a plurality of OFDM symbols. 3GPP LTE standard supports type 1 radio frame structure applicable to frequency division duplex (FDD) and type 2 radio frame structure applicable to time division duplex (TDD).

FIG. 1(*a*) shows the type 1 radio frame structure. A downlink radio frame is divided into 10 subframes. Each subframe is further divided into two slots in the time domain. A unit time during which one subframe is transmitted is defined as Transmission Time Interval (TTI). For example, one subframe may be 1 ms in duration and one slot may be 0.5 ms in duration. A slot may include a plurality of OFDM symbols in the time domain and include a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot may be changed according to the configuration of a Cyclic Prefix (CP). There are an extended CP and a normal CP. For example, the number of OFDM symbols included in one slot may be seven in case of a normal CP. In case of an extended CP, the length of one OFDM symbol is increased and thus the number of OFDM symbols included in one slot is less than that in case of a normal CP. In case of the extended CP, for example, the number of OFDM symbols included in one slot may be six. If a channel state is instable as is the case when a UE moves fast, the extended CP may be used in order to further reduce inter-symbol interference.

In case of a normal CP, since one slot includes seven OFDM symbols, one subframe includes 14 OFDM symbols. The first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. DwPTS is used to perform initial cell search, synchronization, or channel estimation. UpPTS is used to perform channel estimation of a base station and uplink transmission synchronization of a UE. The guard interval (GP) is located between an uplink and a downlink so as to remove interference generated in the uplink due to multi-path delay of a downlink signal. One subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
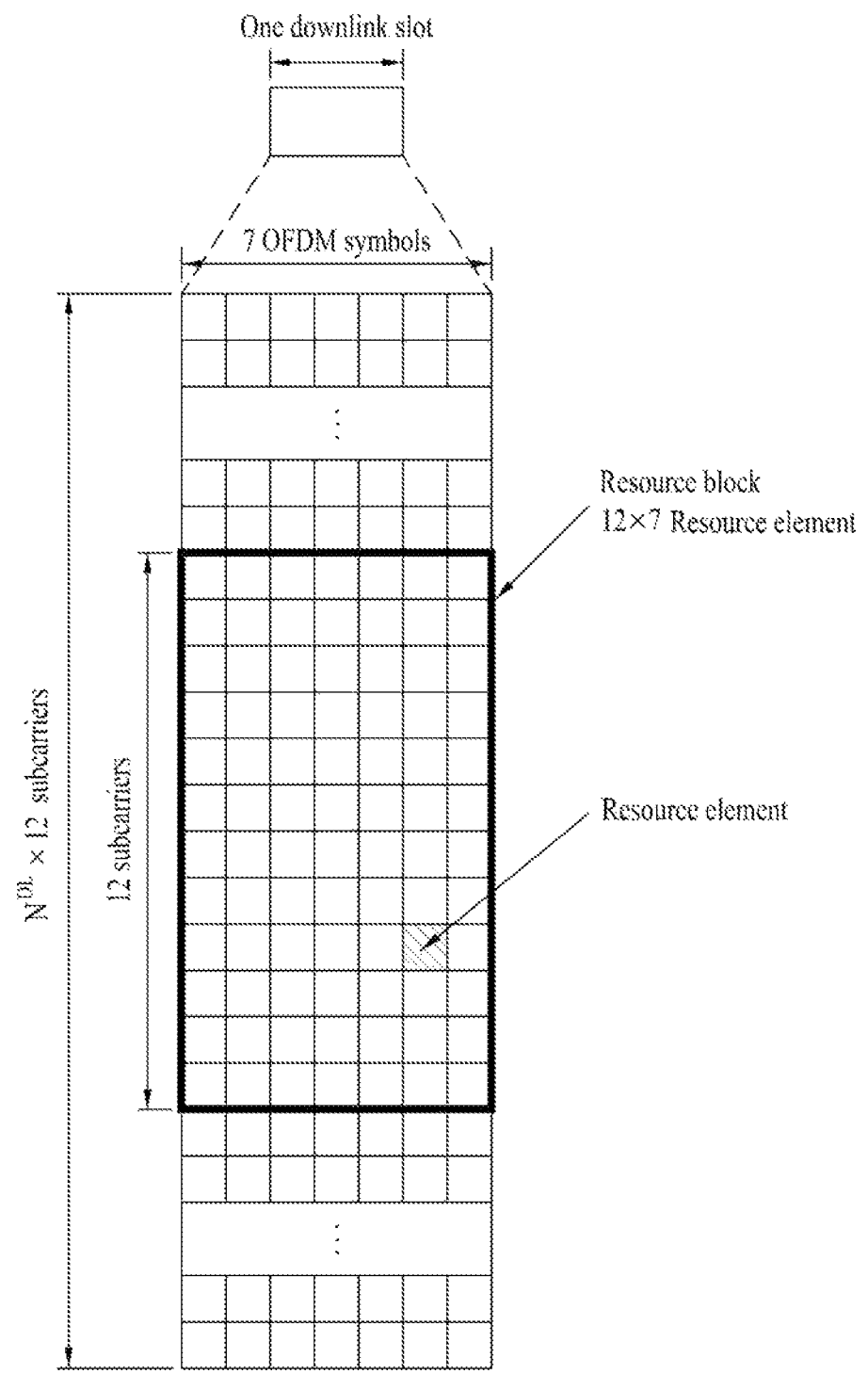
FIG. 2 illustrates a resource grid of a downlink slot.

FIG. 2 is a diagram showing a resource grid in a downlink slot. Although one downlink slot includes seven OFDM symbols in the time domain and one RB includes 12 subcarriers in the frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
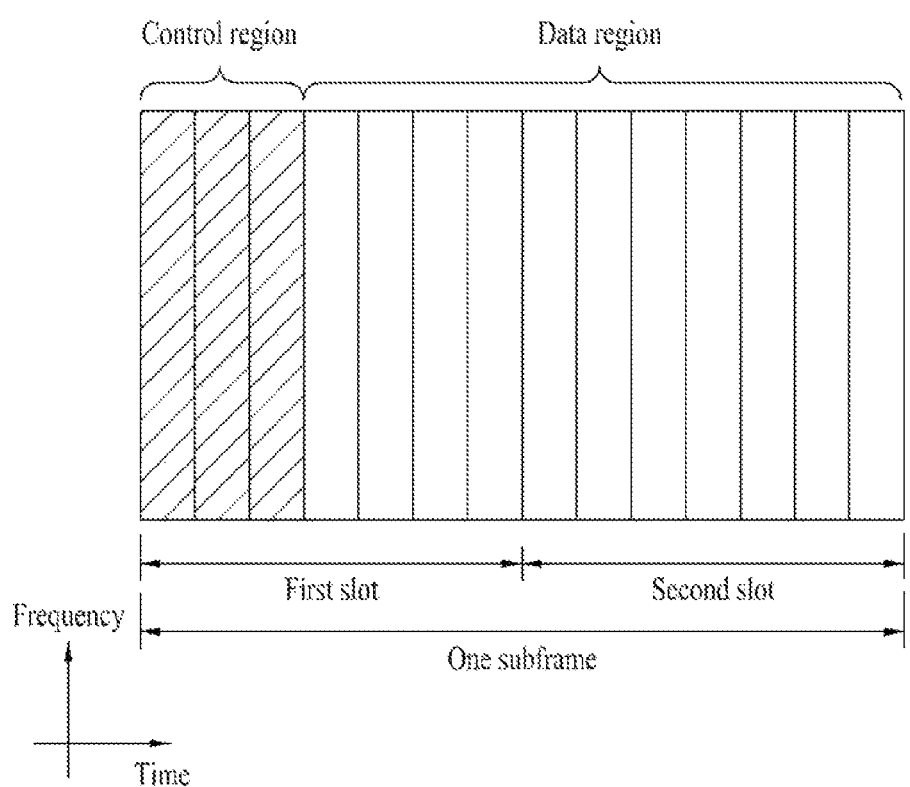
FIG. 3 illustrates a downlink subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
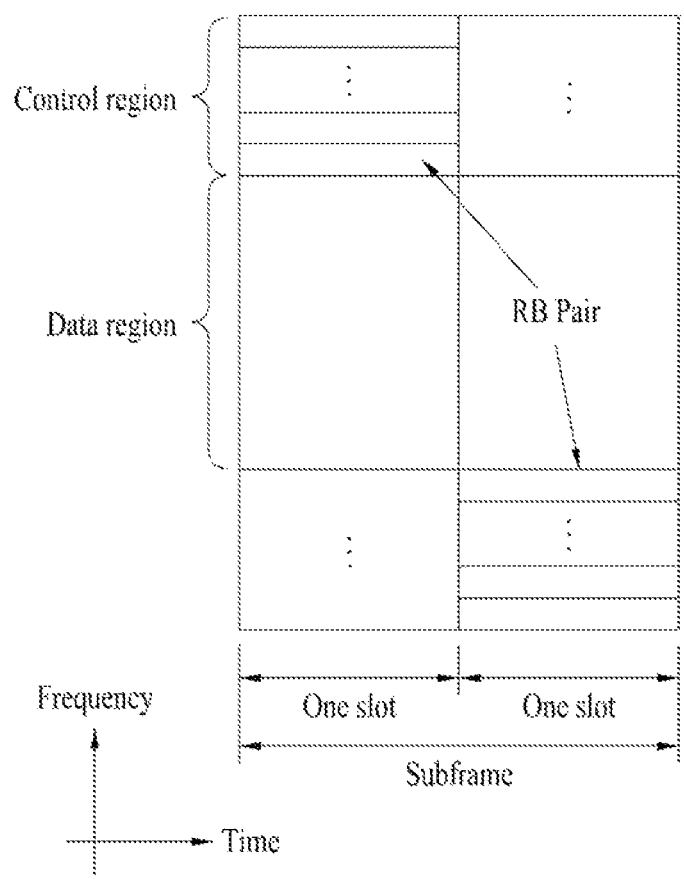
FIG. 4 illustrates an uplink subframe structure.

FIG. 4 is a diagram showing the structure of an uplink frame. The uplink subframe may be divided into a control region and a data region in a frequency region. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is frequency-hopped at a slot edge.

Reference Signal (RS)

When a packet is transmitted in a wireless communication system, signal distortion may occur during transmission since the packet is transmitted through a radio channel. To correctly receive a distorted signal at a receiver, distortion in the received signal needs to be corrected using channel information. To detect the channel information, a method of transmitting a signal known to both the receiver and a transmitter and detecting the channel information using a degree of distortion when the signal is received through a channel is used. This signal is referred to as a pilot signal or a reference signal.

When data is transmitted and received using multiple antennas, a correct signal can be received only when a channel state between each transmission antenna and each reception antenna is recognized. Accordingly, a separate reference signal needs to be present per transmission antenna, more specifically, per antenna port.

Reference signals may be classified into an uplink reference signal and a downlink reference signal. In LTE, i) a demodulation-reference signal (DM-RS) for channel estimation for coherent demodulation of information transmitted through a PUSCH and a PUCCH and ii) a sounding reference signal (SRS) for uplink channel quality measurement by a base station at different frequencies are used as uplink reference signals. Downlink reference signals include i) a cell-specific reference signal (CRS) shared by all UEs in a cell, ii) a UE-specific reference signal for a specific UE only, iii) a DM-RS transmitted for coherent demodulation when a PDSCH is transmitted, iv) a channel state information-reference signal (CSI-RS) for delivering channel station information (CSI) when a downlink DMRS is transmitted, v) a multimedia broadcast single frequency network (MB-SFN) reference signal transmitted for coherent demodulation of a signal transmitted in an MBSFN mode and vi) a positioning reference signal used to estimate geographical position information of a UE.

Reference signals may be classified into two types according to purpose: a reference signal for channel information acquisition and a reference signal used for data demodulation. The former needs to be transmitted in a wide band since it is used for a UE to acquire channel information on downlink and to be received by even a UE that does not receive downlink data in a specific subframe. Furthermore, the reference signal for channel information acquisition is used in a handover situation. The latter is transmitted along with a corresponding resource by a base station during downlink transmission. A UE can demodulate data through channel measurement by receiving the reference signal for data demodulation. This reference signal needs to be transmitted in a region in which data is transmitted.

The CRS is used for channel information acquisition and date demodulation and a UE-specific reference signal is used for data demodulation only. The CRS is transmitted per subframe in a wide band and CRSs for a maximum of 4 antenna ports are transmitted according to the number of transmit antennas of a base station.

For example, when the number of transmit antennas of the base station is 2, CRSs for antenna ports #0 and #1 are transmitted. When the number of transmit antennas of the base station is 4, CRSs for antenna ports #0 to #3 are transmitted.

Figure 7:
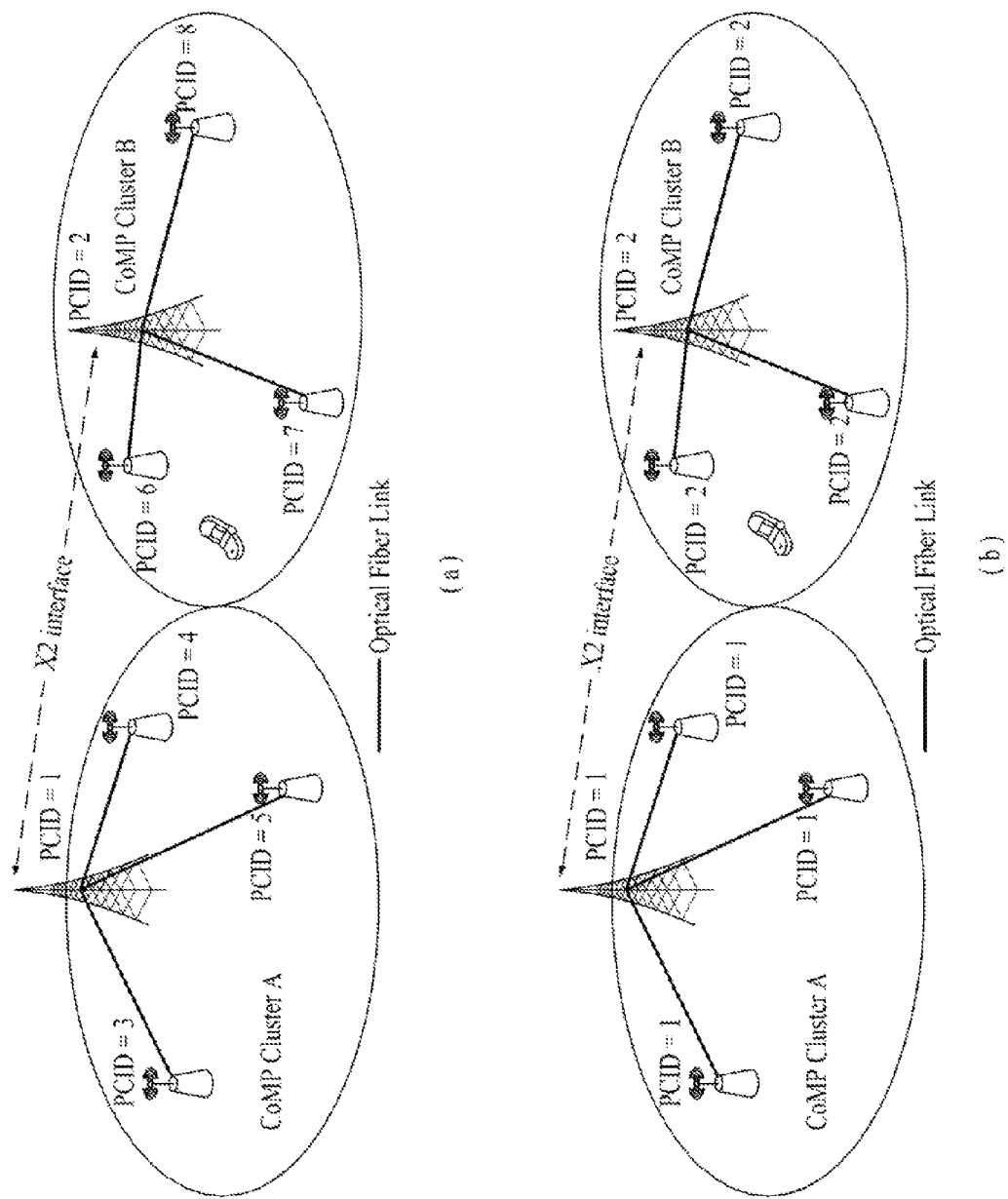
FIG. 7 illustrates a CoMP cluster.

FIG. 7 illustrates patterns in which CRSs and DRSs defined in 3GPP LTE (e.g. release-8) are mapped to a downlink resource block (RB) pair. The downlink RB pair as a reference signal mapping unit can be represented as 12 subcarriers per one subframe×frequency in the time domain. That is, one RB pair has a length corresponding to 12 OFDM symbols in the time domain in the case of normal CP (a length corresponding to 14 OFDM symbols in FIG. 7(a) and a length corresponding to 12 OFDM symbols in FIG. 7(b)).

FIG. 5 shows positions of reference signals in the RB pair in a system supporting 4 transmit antennas. In FIG. 7, resource elements (REs) indicated by '0', '1', '2' and '3' correspond to CRS positions for antenna port indices 0, 1, 2 and 3 and REs indicated by 'D' correspond to DMRS positions.

Channel State Information-RS (CSI-RS)

The CSI-RS is for LTE-A supporting up to 8 antenna ports on downlink and is a reference signal for channel measurement, distinguished from the CRS for channel measurement and data demodulation. Accordingly, the CSI-RS need not be transmitted per subframe like the CRS. The CSI-RS is used in transmission mode 9 and the DMRS is transmitted for data demodulation.

More specifically, the CSI-RS can be transmitted through 1, 2, 4 or 8 antenna ports. Antenna port #15 can be used in the case of one antenna port, antenna ports #15 and #16 can be used in the case of two antenna ports, antenna ports #15 to #18 can be used in the case of 4 antenna ports and antenna ports #15 to #22 can be used in the case of 8 antenna ports.

The CSI-RS can be generated using Equation 1.

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, N_{RB}^{max,DL} - 1$$

[Equation 1]

Here, $r_{l,n_s}(m)$ denotes a generated CSI-RS, c(i) denotes a pseudo random sequence, $n_S$ represents a slot number, l represents an OFDM symbol and $N_{RB}^{max,DL}$ represents a maximum number of RBs of a downlink bandwidth.

The CSI-RS generated through Equation 1 can be mapped to an RE per antenna port using Equation 2.

$$a_{k,l}^{(p)} = w_{l''} \cdot r_{l,n_s}(m')$$

[Equation 2]

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-19,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2, k', l' can be determined according to CSI-RS configuration as shown in Table 1.

TABLE 1

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

The CSI-RS is mapped to RE per antenna port in a specific CSI-Rs configuration according to Equation 2 and Table 1.

As described above, the CSI-RS may be transmitted in a specific subframe rather than per subframe. Specifically, the CSI-RS may be transmitted in a subframe that satisfies Equation 3 with reference to CSI-RS subframe configurations as shown in Table 2.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

$$(10n_f + \lfloor n_s/2 \rfloor - \Delta_{CSI-RS}) \bmod T_{CSI-RS} = 0 \quad \text{[Equation 3]}$$

In Table 2, $T_{CSI-RS}$ denotes a CSI-RS transmission period, $\Delta_{CSI-RS}$ denotes an offset value, $n_f$ represents system frame number and $n_s$ represents a slot number.

The aforementioned CSI-RS can be signaled to a UE as a CSI-RS configuration information element as shown in Table 3.

TABLE 3

```
CSI-RS-Config-r10 ::=        SEQUENCE {
    csi-RS-r10                   CHOICE {
        release                      NULL,
        setup                        SEQUENCE {
            antennaPortsCount-r10        ENUMERATED
{an1, an2, an4, an8},
            resourceConfig-r10           INTEGER (0 . . .
                                             31),
            subframeConfig-r10           INTEGER (0 . . .
                                             154),
            p-C-r10                      INTEGER
(-8 . . . 15)
        }
    }
                                 OPTIONAL,    -- Need ON
    zeroTxPowerCSI-RS-r10        CHOICE {
        release                      NULL,
        setup                        SEQUENCE {
            zeroTxPowerResourceConfigList-r10   BIT STRING
(SIZE (16)),
            zeroTxPowerSubframeConfig-r10       INTEGER (0 . . .
                                             154)
        }
    }
                                 OPTIONAL     -- Need ON
}
```

In Table 3, 'antennaPortsCount-r10' indicates the number of antennas through which the CSI-RS is transmitted (1, 2, 4 or 8), 'resourceConfig-r10' indicates REs located in one RB at a time-resource frequency and 'subframeConfig-r10' indicates a subframe in which the CSI-RS is transmitted and a CSI-RS EPRE with respect to a PDSCH EPRE. In addition, the eNB transmits information about a zero power CSI-RS.

In CSI-RS Config, 'resourceConfig-r10' indicates a position in which the CSI-RS is transmitted. Specifically, 'resourceConfig-10 indicates a correct symbol and subcarrier position in one RB according to CSI-RS configuration number represented by a number in the range of 0 to 31.

FIG. 6(*a*) shows a CSI-RS configuration in the case of frame structure type 1 (that is, FDD). In FIG. 6, numerals represent numbers indicated in columns of Table 1 and mapped to frequency resources.

FIG. 6(*b*) shows that CSI-RS positions in one RB are mapped to antenna ports. FIG. 6(*b*) shows cases of 2, 4 and 8 antenna ports. In FIG. 6(*b*), values corresponding to numbers 0 to 7 indicate CSI-RS transmission positions corresponding to respective antenna ports when the number of antennas through which CSI-RSs are transmitted is 8. That is, the values indicate antenna ports through which CSI-RSs are transmitted. When CSI-RSs for two antennas are transmitted per cell, two CSI-RSs can be mapped to 20 positions and 2-port CSI-RSs of a maximum of 20 different cells can be multiplexed in one subframe. When CSI-RSs for 8 antennas are transmitted per cell, a maximum of 5 CSI-RS configurations can be multiplexed in one subframe and a maximum of 5 different 8-port CSI-RSs can be multiplexed in one subframe.

In CoMP in which a plurality of cells is cooperated, which will be described later, a channel measurement/reporting set for a specific UE can be indicated by allocating a plurality of CSI-RS resources that the UE needs to measure/report. For example, a plurality of csi-RS-r10 elements can be repeated, as shown in Table.

TABLE 4

| | | |
|---|---|---|
| csi-RS-r10 | CHOICE { | |
| release | | NULL, |
| setup | | SEQUENCE { |
| antennaPortsCount-r10 | | ENUMERATED {an1, an2, an4, an8}, |
| resourceConfig-r10 | | INTEGER (0 . . . 31), |
| subframeConfig-r10 | | INTEGER (0 . . . 154), |
| p-C-r10 | | INTEGER (−8 . . . 15) |
| } | | |

Coordinated Multi-Point: CoMP

CoMP transmission and reception technology (referred to as co-MIMO, collaborative MIMO, network MIMO or the like) is proposed according to enhanced system performance requirements of 3GPP LTE-A. CoMP can improve the performance of a UE located at a cell edge and increase average sector throughput.

In general, in a multi-cell environment in which a frequency reuse factor is 1, the performance of a UE located at a cell edge and average sector throughput may be decreased due to inter-cell interference (ICI). To reduce ICI, a method of enabling the UE located at a cell edge to have appropriate throughput in an environment having restrictions due to interference using a simple passive technique such as fractional frequency reuse (FFR) through UE specific power control is employed in LTE. However, it may be desirable to reduce ICI or to reuse ICI as a signal that a UE desires rather than decreasing frequency resource use per cell. To this end, the CoMP transmission scheme may be applied.

CoMP schemes applicable to downlink may be classified into joint processing (JP) and coordinated scheduling/beamforming (CS/CB).

According to the JP, each transmission point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In the case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

A CoMP cluster refers to a set of cells capable of performing CoMP operation, that is, cooperative scheduling and cooperative data transmission and reception. For example, cells included in a single cluster can be assigned different physical cell IDs (PCIDs), as shown in FIG. 7(a), and cells included in a single cluster can share the same PCID and be configured in the form of distributed antennas or RRHs of a single eNB, as shown in FIG. 7(b). In a modified form, some of cells included in a single cluster can share the same PCID.

In general, cells in the same CoMP cluster can perform cooperative scheduling since the cells are connected through a backhaul link such as an optical fiber having large capacity and low latency and enable cooperative data transmission since the cells are maintained in a synchronized state. The size of the CoMP cluster needs to be determined such that a reception time difference between signals transmitted from cells included in the CoMP cluster and participating in cooperative transmission, which is caused by a propagation delay difference between the cells, is within a cyclic prefix (CP) length of an OFDM symbol when signals transmitted from the cells are received. Cells belonging to different clusters may be connected through a backhaul link having smaller capacity and may not maintain synchronization.

Some or all cells included in a CoMP cluster perform cooperative scheduling and cooperative data transmission/reception for a CoMP UE and the CoMP UE measures reference signal transmitted from some or all cells in the CoMP cluster according to quality of received signals. To measure link performance between the UE and each cell, the UE measures a reference signal of each cell and reports signal quality. Cells that the UE needs to measure can be defined as a CoMP measurement set.

For CoMP, it is necessary to define a reference resource set in which the UE needs to measure and report a channel because a CoMP scheme and downlink scheduling of the UE are determined according to channel information per cell, which is reported by the UE on uplink. Information about a cell transmitting a signal that needs to be measured/reported by the UE, that is, a CoMP measurement set should be transmitted through higher layer signaling. The CoMP measurement set can be signaled as CSI-RS resources.

Inter Cell Interference Coordination (ICIC)

In a heterogeneous network environment and/or a CoMP environment, interference between neighboring cells may be a problem. To solve this inter-cell interference problem, inter-cell interference coordination (ICIC) is applicable.

In 3GPP LTE release-8, a given frequency region (e.g. system bandwidth) is divided into one or more sub-frequency regions (e.g. PRBs) and an ICIC message with respect to each sub-frequency region is exchanged between cells. For example, RNTP (Relative Narrowband Transmission Power) related to downlink transmission power and UL IOI (Interference Overhead Indication) and UL HII (High Interference Indication) are defined as information included in an ICIC message for a frequency resource.

RNTP is information that indicates downlink transmission power used by a cell transmitting an ICIC message in a corresponding sub-frequency region. For example, when the RNTP field is set to a first value (e.g. 0) in a specific sub-frequency region, this means that downlink transmission power of the cell does not exceed a threshold in the corresponding sub-frequency region. When the RNTP field is set to a second value (e.g. 1), this means that downlink transmission power cannot be allotted in the corresponding sub-frequency region. In other words, downlink transmission power of the corresponding cell can be regarded as a low value in the corresponding sub-frequency region when the RNTP field is set to 0, whereas downlink transmission power of the corresponding cell cannot be regarded as a low value in the corresponding sub-frequency region when the RNTP field is set to 1.

UL IOI is information that indicates the quantity of uplink interference that a cell transmitting an ICIC message suffers in a specific sub-frequency region. For example, when the UL IOI field is set to a high value in a specific sub-frequency region, this means that the cell suffers severe uplink interference in the sub-frequency region. In this case, a cell that has received the ICIC message can schedule a UE using low uplink transmission power from among UEs served thereby in the sub-frequency region in which the UL IOI field indicates high interference. Accordingly, UEs perform uplink transmission with low transmission power in the sub-frequency region corresponding to IOI indicating high uplink interference, and thus interference applied to the neighboring cell (i.e. the cell transmitting the ICIC message) can be mitigated.

UL HII is information that indicates a degree of interference (or uplink interference sensitivity) that can be caused by uplink transmission of a cell transmitting an ICIC message in a corresponding sub-frequency domain. For example, when the UL HII field is set to a first value (e.g. 1) in a specific sub-frequency region, this means that there is possibility that the cell transmitting the ICIC message schedules a UE using high uplink transmission power in the corresponding sub-frequency region. On the contrary, if the UL HII field is set to a second value (e.g. 0) in a specific sub-frequency region, this means that there is possibility that the cell transmitting the ICIC message schedules a UE using low uplink transmission power in the corresponding sub-frequency region. In this case, a cell that has received the ICIC message can schedule UEs that can successfully operate even under high interference in a sub-frequency region in which UL HII is set to the first value (e.g. 1) while preferentially using a sub-frequency region in which UL HII is set to the second value (e.g. 0) for UE scheduling in order to avoid interference from the cell transmitting the ICIC message.

As an example of ICIC for time resources, a method of dividing a given time region into one or more sub-time regions (e.g. subframes) in the frequency domain and exchanging information about whether each sub-time region is silenced between cells is defined in 3GPP LTE-A (or 3GPP LTE release-10). A cell transmitting an ICIC message sends information about silencing in a specific subframe to neighboring cells and does not schedule a PDSCH or a PUSCH in the corresponding subframe. A cell receiving the ICIC message can schedule uplink and/or downlink transmission for a UE in the subframe in which the cell transmitting the ICIC message performs silencing.

Silencing may refer to an operation in which a specific cell does not transmit most signals (or performs transmission using 0 or low power) on uplink and downlink in a specific subframe. As an example of the silencing operation, a specific cell can configure a specific subframe as an MBSFN (Multicast Broadcast Single Frequency Network) subframe. In a downlink subframe configured as an MBSFN subframe, a signal is transmitted in a control region and a signal is not transmitted in a data region. As another example of the silencing operation, an interfering cell may configure a specific subframe as an ABS (Almost Blank Subframe) or an ABS-with-MBSFN. The ABS refers to a subframe in which only a CRS is transmitted in a control region and a data region and control information and data are not transmitted (or transmission with low power is performed). However, a downlink channel and a downlink signal such as PBCH, PSS, SSS and the like can be transmitted even in the ABS. The ABS-with-MBSFN refers to a case in which the CRS of the data region is not transmitted in the ABS. Silencing can be performed for a specific subframe, as described above, and information indicating whether silencing is performed can be referred to as a silent subframe pattern.

As to the ABS, ABS signaling defined in 3GPP LTE-A includes ABS information and ABS status. The ABS information represents subframes to be used as ABSs as a bitmap and is composed of a 40-bit bitmap in case of FDD and a bitmap of up to 70 bits according to UL-DL configuration in case of TDD. In the case of FDD, 40 bits represent 40 subframes, a bit having a value of 1 indicates an ABS and a bit having a value of 0 indicates a non-ABS. When restricted measurement is configured for a UE, the number of CRS antenna ports of a corresponding cell is signaled to the UE for CRS measurement. A measurement subset is a subset of ABS pattern information and corresponds to a 40-bit bitmap in the case of FDD and a bitmap of up to 70 bits in the case of TDD. The measurement subset is a recommended restricted measurement set for configure restricted measurement for a UE. Table 3 shows ABS information defined in LTE/LTE-A.

TABLE 3

| IE/Group Name | Presence | Range | IE type and reference | Semantics description |
|---|---|---|---|---|
| CHOICE ABS Information | M | — | — | |
| >FDD | | | — | — |
| >>ABS Pattern Info | M | | BIT STRING (SIZE(40)) | Each position in the bitmap represents a DL subframe, for which value "1" indicates 'ABS' and value "0" indicates 'non-ABS'. The first position of the ABS pattern corresponds to subframe 0 in a radio frame where SFN = 0. The maximum number of subframes is 40. |
| >>Number Of Cell-specific Antenna Ports | M | | ENUMERATED (1, 2, 4, . . .) | P - Number of antenna ports for cell-specific reference signals |
| >>Measurement Subset | M | | BIT STRING (SIZE(40)) | This indicates a subset of the ABS pattern information and is used to configure specific measurement towards the UE. |
| >TDD | | | — | — |
| >>ABS Pattern Info | M | | BIT STRING (1 . . . 70, . . .) | Each position in the bitmap represents a DL subframe, for which value "1" indicates 'ABS' and value "0" indicates 'non-ABS'. The maximum number of subframes depends on UL/DL subframe configuration. The maximum number of subframes is 20 for UL/DL subframe configurations 1 to 5, 60 for UL/DL subframe configuration 6 and 70 for UL/DL subframe configuration 0. The first position of the ABS pattern corresponds to subframe 0 in a radio frame where SFN = 0. The ABS pattern is continuously repeated in all radio frames and restarted each time SFN = 0. |
| >>Number Of Cell-specific Antenna Ports | M | | ENUMERATED (1, 2, 4, . . .) | P - Number of antenna ports for the cell-specific reference signals |
| >>Measurement Subset | M | | BIT STRING (1 . . . 70, . . .) | This indicates a subset of the ABS pattern information and is used to configure specific measurement towards the UE. |
| >ABS Inactive | M | | NULL | This indicates that interference coordination by means of almost blank subframe is not active. |

Table 4 shows ABS status information elements defined in LTE/LTE-A. The ABS status information elements are used for an eNB to change the ABS pattern. In Table 4, 'Usable ABS Pattern Info' is bitmap information that is a subset of the ABS pattern information and indicates whether a subframe allocated as an ABS has been correctly used for interference mitigation. In addition, 'DL ABS status' is a ratio of the number of DL RBs scheduled in a subframe indicated by 'Usable ABS Pattern Info' to the number of RBs allocated for a UE that needs to be protected through the ABS and indicates information about how the ABS has been efficiently used in a victim cell.

TABLE 4

| IE/Group Name | Presence | Range | IE type and reference | Semantics description |
|---|---|---|---|---|
| DL ABS status | M | | INTEGER (0 . . . 100) | Percentage of ABS resources. The numerator of the percentage calculation consists of RBs within the ABS indicated in Usable ABS Pattern Info IE allocated by eNB2. The denominator of the percentage calculation is the total quantity of RBs within the ABS indicated in Usable ABS Pattern Info IE. |

TABLE 4-continued

| IE/Group Name | Presence | Range | IE type and reference | Semantics description |
|---|---|---|---|---|
| CHOICE Usable ABS Information | M | — | — | |
| >FDD | | | — | — |
| >>Usable ABS Pattern Info | M | | BIT STRING (SIZE(40)) | Each position in the bitmap represents a subframe, for which value "1" indicates 'ABS' and value "0" is used for all other subframes. The pattern represented by the bitmap is a subset corresponding to ABS Pattern Info IE conveyed in LOAD INFORMATION from the eNB. |
| >TDD | | | — | — |
| >>Usable ABS Pattern Info | M | | BIT STRING (1 . . . 70) | Each position in the bitmap represents a subframe, for which value "1" indicates 'ABS' and value "0" is used for all other subframes. The pattern represented by the bitmap is a subset corresponding to ABS Pattern Info IE conveyed in LOAD INFORMATION from the eNB. |

The measurement subset corresponding to a subset of the ABS pattern is a subframe statically used as an ABS, and a transmission point can determine whether other subframes included in the ABS pattern are used as ABSs according to traffic load.

Channel State Information (CSI) Feedback

MIMO can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver can perform beamforming based on CSI to obtain MIMO Tx antenna multiplexing gain. The transmitter (e.g. eNB) can allocate an uplink control channel or an uplink shared channel to the receiver (e.g. UE) such that the receiver can feed back CSI.

CSI fed back may include a rank indicator (RI), a precoding matrix index (PMI) and a channel quality indictor (CQI).

The RI indicates information about a channel rank. The channel rank represents a maximum number of layers (or streams) through which different pieces of information can be transmitted through the same time-frequency resource. The RI is determined by long term fading of a channel, and thus the RI can be fed back to an eNB at a longer period than the PMI and CQI.

The PMI is information about a precoding matrix used for transmission from a transmitter and is a value in which spatial characteristics of a channel are reflected. Precoding refers to mapping a transport layer to a transmit antenna. A layer-to-antenna mapping relation can be determined by a precoding matrix. The PMI indicates a precoding matrix index of an eNB preferred by a UE based on a metric such as signal-interference plus noise ratio (SINR). To reduce feedback overhead of precoding information, the transmitter and receiver can share a codebook including precoding matrices and only an index indicating a specific precoding matrix in the codebook can be fed back.

In a system supporting an extended antenna configuration (e.g. LTE-A), additional multi-user diversity is obtained using multi-user MIMO (MU-MIMO). When an eNB performs downlink transmission using CSI fed back by one of multiple UEs, it is necessary to prevent downlink transmission from interfering with other UEs since an interference channel is present between UEs multiplexed in the antenna domain in MU-MIMO. Accordingly, MU-MIMO requires more accurate CSI feedback than single user MIMO (SU-MIMO).

For more accurate CSI measurement and reporting, a new CSI feedback scheme in which the CSI including the RI, PMI and CQI is improved may be applied. For example, precoding information fed back by a receiver can be indicated by a combination of two PMIs. One (first PMI) of the two PMIs may be referred to as W1 having attributes of long term and/or wideband and the other (second PMI) may be referred to as W2 having attributes of short term and/or subband. A final PMI can be determined by a combination of W1 and W2. For example, when the final PMI is W, W=W1*W2 or W=W2*W1.

The CQI indicates channel quality or channel intensity. The CQI can be represented as a predetermined MCS combination. That is, a fed back CQI index indicates a corresponding modulation scheme and a code rate. The CQI represents a value in which a reception SINR that can be obtained when an eNB configures a spatial channel using the PMI is reflected.

LTE/LTE-A defines a CSI reference resource related to channel measurement for CSI feedback/report. The CSI reference resource is defined as a group of physical RBs corresponding to a frequency band related to a calculated CQI in the frequency domain. The CSI reference resource is defined as n-nCQI_ref in the time domain. Here, n denotes a subframe in which CSI is transmitted/reported and nCQI_ref is i) a minimum value from among 4 or more values, which corresponds to a valid subframe in case of periodic CSI report, ii) a valid subframe corresponding to a subframe in which a CSI request is transmitted in an uplink DCI format in case of aperiodic CSI report and iii) 4 in case of CSI request in random access acknowledgement in aperiodic CSI report. Here, a valid subframe refers to a subframe satisfying conditions that the corresponding subframe should be a downlink subframe for a corresponding UE, the corresponding subframe should not be an MBSFN subframe in transmission modes other than transmission mode 9, the length of DwPTS should be greater than a predetermined size in TDD, the corresponding subframe should not be included in a measurement gap set for the corresponding UE, and the corresponding subframe should correspond to an element of a CSI subframe set when the corresponding subframe is configured to the CSI subframe set for the UE in periodic CSI report. The CSI subframe set is used for restricted measurement, which will be described later. CSI subframe sets $C_{CSI,0}$ and $C_{CSI,1}$ can be configured for the corresponding UE by a higher layer. The CSI reference resource is included in one of the two CSI subframe sets $C_{CSI,0}$ and $C_{CSI,1}$ ($C_{CSI,0}$ is represented as C0 and $C_{CSI,1}$ is represented as C1 hereinafter for convenience) and may not be included in both CSI subframe sets.

Restricted Measurement

When a cell reduces transmission power in a specific resource region, a variation in interference signals for respective resource regions, received by a neighboring cell, increases. When the interference signals are averaged irrespective of resource region, it is difficult to obtain the effects of CoMP and ICIC. This is described with reference to FIG. 8.

Figure 8:
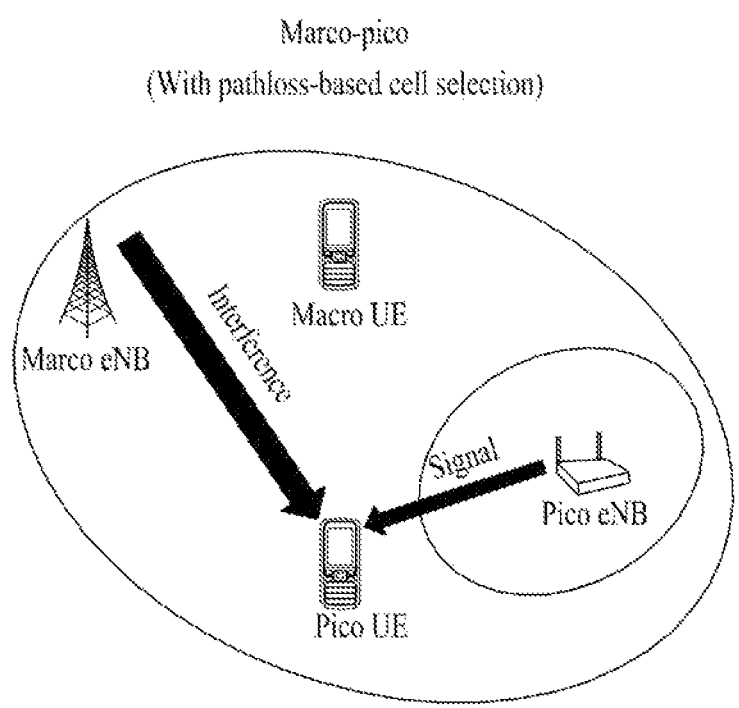
FIGS. 8 and 9 illustrate environments to which an embodiment of the present invention is applicable.

In FIG. 8, a macro eNB operates as an aggressor cell for a pico eNB in a normal situation. The macro cell can secure/protect the performance of the pico eNB using the aforementioned ABS (Almost Blank Subframe) for the pico eNB/pico UE corresponding to a victim cell. Specifically, the macro cell can deboost transmission power of up to 9 dB in a specific subframe (or subframes) or may not transmit a signal, resulting in cell range extension (CRE) of the pico eNB. In other words, when the macro cell deboosts downlink transmission power in an ABS, received signal performance of a UE located at a cell edge is improved such that a signal of the pico eNB, received as a signal lower than a noise level in a normal subframe, is stably received in the ABS, and thus the cell coverage of the pico eNB can be regarded as extended.

In this situation, restricted measurement can be used for measurement report. That is, when the macro cell deboosts transmission power in a specific subframe through the ABS, a signal level and/or an interference level of the pico eNB, detected by a UE, are largely varied according to subframe. In this case, it is possible to prevent simple averaging of signals by introducing restricted measurement.

For restricted measurement, when a plurality of CSI subframe sets (e.g. C0 and C1) for channel measurement is signaled to a UE through higher layer signaling, the UE can perform CSI subframe set specific channel measurement and reporting. For RLM/RRM, the UE preferably performs measurement in an ABS of the macro cell.

A description will be given of methods for efficiently performing signal and/or interference measurement reporting when a CSI-RS is used for measurement report in a CoMP environment.

Figure 9:
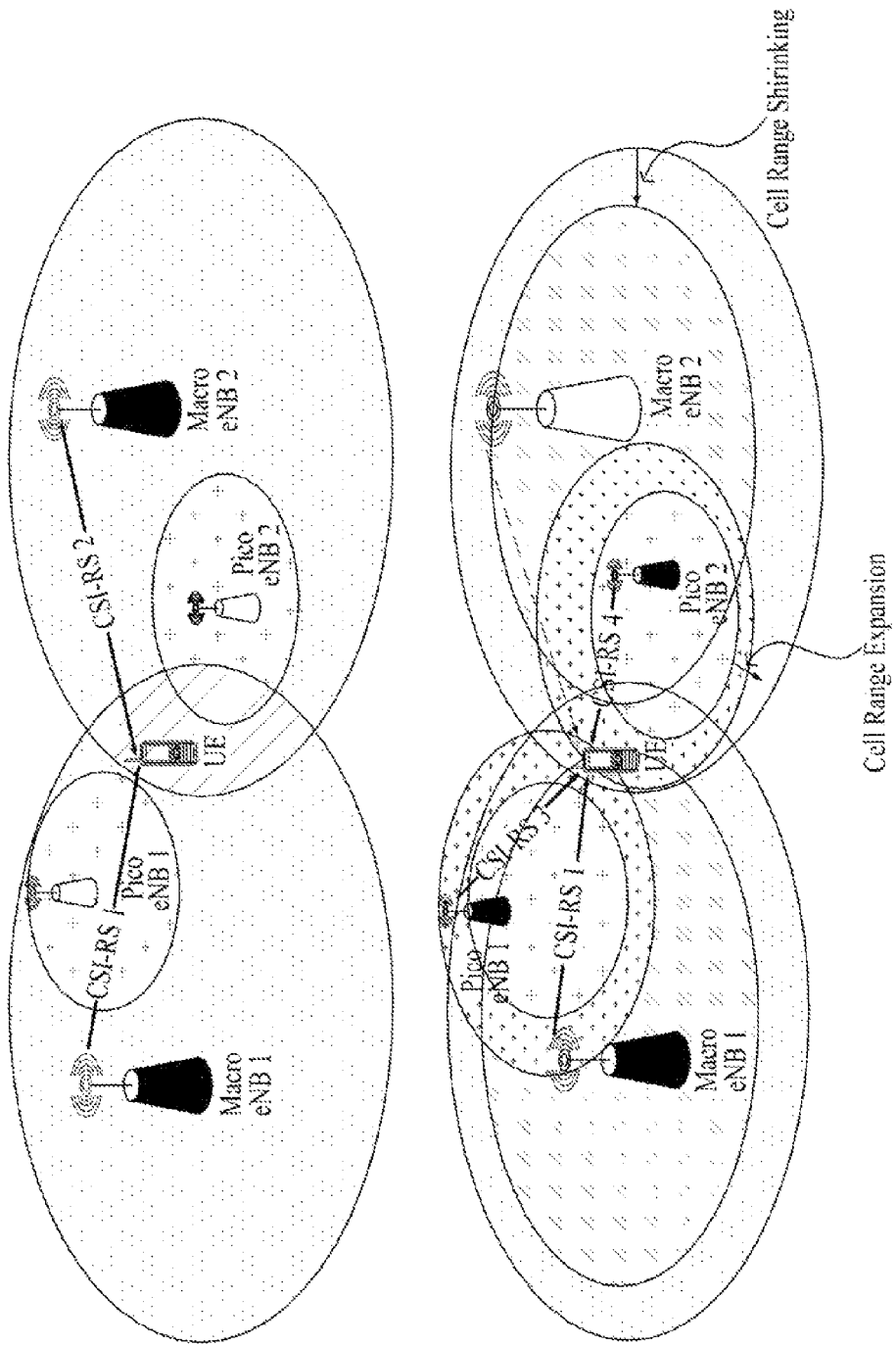

FIG. 9 illustrates an exemplary CoMP situation related to an embodiment of the present invention. Specifically, FIG. 9(a) shows a case in which ICIC is not applied to macro eNB 1 and macro eNB 2 and FIG. 9(b) shows a case in which macro cell 2 uses an ABS. Macro eNB 1 transmits a CSI-RS according to CSI-RS configuration 1 (CSI-RS 1), macro eNB 2 transmits a CSI-RS according to CSI-RS configuration 2 (CSI-RS 2), pico eNB 1 transmits a CSI-RS according to CSI-RS configuration 3 (CSI-RS 3) and pico eNB 2 transmits a CSI-RS according to CSI-RS configuration 4 (CSI-RS 4). In this case, a reference set of CSI measurement/report of a UE may be represented by CSI-RS 1 and CSI-RS 2 in a normal subframe in a situation such as FIG. 9(a) and represented by CSI-RS 1, CSI-RS 3 and CSI-RS 4 when an ABS is applied as shown in FIG. 9(b).

In other words, in a normal case in which the ABS is not applied, as shown in FIG. 9(a), and a case in which ICIC is applied through the ABS, as shown in FIG. 9(b), a UE may need to measure/report CSI for different reference signals for respective subframes. When restricted measurement is configured for the UE, the UE is allocated two different CSI subframe sets and measures/reports CSI per CSI subframe set. This is because correct CSI is not calculated when channel information about the two CSI subframe sets is averaged due to a difference between interference environments and channel environments of the CSI subframe sets.

CSI measurement/report sets may be respectively defined for CSI subframe sets C0 and C1 having different interference environments. For example, a set that needs to be measured/reported by the UE in the CSI subframe set C0 may be {CSI-RS 1, CSI-RS 2} and a set that needs to be measured/reported by the UE in the CSI subframe set C1 may be {CSI-RS 1, CSI-RS 3, CSI-RS 4}. That is, time-frequency resource regions in which channel information needs to be reported can be respectively determined for the CSI subframe sets C0 and C1.

In other words, for a UE in a CoMP network, which is configured to divide all subframes into a plurality of subsets (e.g. C0 and C1) and to measure/report a signal and/or interference per subset, reference resources for channel state estimation/calculation can be respectively determined for the subsets in a time-frequency resource region.

Figure 10:
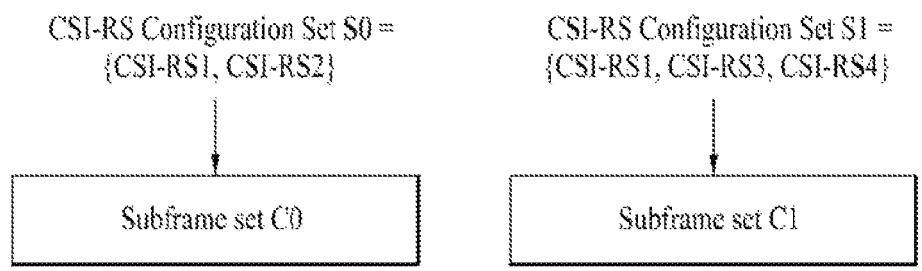
FIG. 10 illustrates channel state reporting according to an embodiment of the present invention.

This is described in detail with reference to FIG. 10. FIG. 10 shows two CSI subframe sets C0 and C1 for restricted measurement. A reference signal for CSI calculation in the CSI subframe set C0 is {CSI-RS 1, CSI-RS 2} corresponding to CSI-RS configuration set S0 and a reference signal for CSI calculation in the CSI subframe set C1 is {CSI-RS 1, CSI-RS 3, CSI-RS 4} corresponding to a CSI-RS configuration set S1. That is, a signal for CSI measurement and reference resources for a signal S and interference I are subframe set-specifically defined. However, CSI-RSs (CSI-RS 1 and CSI-RS 2) corresponding to the CSI-RS configuration set S1 may be transmitted in the CSI subframe set C0. Considering that the CSI-RS is periodically transmitted in a specific subframe interval, the CSI-RSs included in the CSI-RS configuration set S1 may be transmitted in the CSI subframe set C0. However, the CSI-RSs corresponding to the CSI-RS configuration set S1 are not included in resources that need to be measured/reported by a UE in the CSI subframe set C0. That is, a signal that needs to be measured/reported by the UE in a specific subframe is defined according to CSI subframe set. In other words, a CSI report set (or CSI-RS resource) that needs to be reported by the UE can be determined according to subframe. Furthermore, the UE can expect that a PDSCH other than CSI-RSs will be transmitted in resources corresponding to CSI-RS 3 and/or CSI-RS 4 and attempt data decoding to minimize resource waste, unless the resources (CSI-RS 3 and/or CSI-RS 4) are set to a zero-power CSI-RS in subframes corresponding to the CSI subframe set C0, for CSI-RS 3 and/or CSI-RS 4 included in the CSI-RS configuration set 1.

In the aforementioned example, a reference signal that needs to be measured/reported by the UE depends on subframe and a cell must signal the reference signal to the UE. The position of each CSI-RS can be signaled by repeatedly signaling elements such as a plurality of CSI-RS configurations (e.g. csi-RS-r10). That is, CSI-RSs transmitted by 4 cells can be respectively signaled and subframes in which the UE needs to measure the CSI-RSs can be indicated. All CSI-RS configurations that need to be measured/reported by the UE can be signaled irrespective of the CSI subframe sets C0 and C1 and CSI-RSs that need to be reported by the UE for measurement of the corresponding CSI subframe sets can be indicated.

When CSI subframe sets are configured, that is, when restricted measurement is configured for a UE, the CSI subframe sets may be configured on the basis of CSI-RS resources (e.g. the aforementioned CSI-RS 1, CSI-RS 2 and the like). That is, resource sets (e.g. C0 and C1) for restricted measurement may be individually set for each CSI-RS resource belonging to a CSI report set. In other words, when a plurality of CSI-RS resources is configured, the CSI subframe sets can be configured per CSI-RS resource. Specifically, the CSI subframe sets can be independently or individually set per CSI-RS resource.

In addition, when a plurality of CSI-RS resources is configured, two common subframe sets may be configured for transmission points performing CoMP (e.g. in the situation of FIG. 9(*b*)). For example, the CSI subframe sets C01 and C11 can be configured for CSI resource 1 and CSI subframe sets C02 and C12 can be configured for CSI resource 2. Here, C01 and C02 may be subframe sets partially or entirely identical to each other or different subframe sets. Similarly, C11 and C12 may be subframe sets partially or entirely identical to each other or different subframe sets. Alternatively, the CSI subframe sets may not be configured for the CSI resource 1 and the CSI subframe sets C0 and C1 may be configured for the CSI resource 2. Otherwise, when two common CSI subframe sets are configured for transmission points performing CoMP, these two subframe sets may be applied to the CSI resource 1 and may not be applied to the CSI resource 2. That is, the two common subframe sets can be configured/applied to a plurality of CSI resources independently/individually.

In terms of CSI reporting of a UE, a UE for which restricted measurement and a plurality of CSI-RS resources are set can determine CSI reference resources (which may be a specific subframe) from among subframes included in a CSI subframe set for (periodic) CSI report. In addition, a channel may be measured and a CQI may be calculated on the basis of CSI-RS resources included in the CSI reference resources. Here, since channel measurement corresponds to signal measurement in a CSI-RS resource, the signal needs to be a non-zero power CSI-RS and can be indicated by a non-zero power CSI-RS configuration. Then, the UE can report CSI including a CQI calculated for uplink in a subframe in which CSI needs to be reported.

While the aforementioned CSI report set may be reported upon measurement of all CSI-RS configurations included in a CSI-RS configuration set, the CSI report set may be reported by methods described below. The following description is based on the example of FIG. 10.

A CSI-RS configuration having best channel quality may be selected from the CSI configuration set and reported. For example, a CSI-RS configuration having best channel quality can be selected from among CSI-RS 1 and CSI-RS 2 corresponding to CSI-RS configuration set S0 and fed back along with a CSI-RS configuration index for CSI report corresponding to the CSI subframe set C0. Similarly, a CSI-RS configuration having best channel quality can be selected from among CSI-RS 1, CSI-RS 3 and CSI-RS 4 corresponding to CSI-RS configuration set S1 and fed back along with a CSI-RS configuration index for CSI report corresponding to the CSI subframe set C1. That is, in CSI reporting by the UE, a plurality of CSI-RS configuration sets which are candidates of selection may be different according to CSI subframe set.

Subsequently, the UE may calculate and feed back an aggregated CQI/PMI per CSI subframe set. For example, when CSI-RS configurations 1, 2 and 3 have 2 CSI-RS ports and CSI-RS configuration 4 has 4 CSI-RS ports, the CSI-RS configuration set S0can calculate and report a PMI/CQI based on a 4-Tx antenna codebook and the CSI-RS configuration set S1 can calculate and report a PMI/CQI based on an 8-Tx antenna codebook.

When aperiodic CSI reporting is configured, that is, when a cell instructs the UE to report CSI at necessary time through a CSI request field such as DCI format 0, reference resources for CSI reporting may be dynamically determined as follows, distinguished from periodic CSI reporting in which reference resources for CSI reporting are semi-statically determined When the UE receives a CSI request regarding aperiodic CSI reporting through a PDCCH in the CSI subframe set C0, the UE may feed back CSI about the CSI configuration set S0 related to the CSI subframe set C0. When the UE receives the CSI request in the CSI subframe set C1, the UE may feed back CSI about the CSI subframe set S1.

A reference resource for CSI report may be determined in association with the CSI request field. The CSI request field may have a length of 1 bit or 2 bits according to search space position. A PDCCH in DCI format 0 including the 1-bit CSI request field may be present in a common search space and a PDCCH in DCI format 0 including the 2-bit CSI request field may be located in a UE specific search space. In the case of 2-bit CSI request field, a CSI-RS configuration for which CSI needs to be reported may be predetermined through RRC. That is, a CSI-RS configuration set can be determined according to a CSI subframe set (C0 or C1) including a subframe in which a PDCCH is transmitted and a specific CSI-RS configuration in the CSI-RS configuration set can be indicated according to a value of the CSI request field. For example, when a subframe through which a CSI request is received corresponds to the CSI subframe set C0, a CSI request field value of 00 can indicate no CSI reporting and 01, 10 and 11 can respectively indicate reporting of {CSI-RS 1}, {CSI-RS 2} and {CSI-RS2}. In addition, when the subframe through the CSI request is received corresponds to the CSI subframe set C1, a CSI request field value of 00 can indicate no CSI reporting and 01, 10 and 11 can respectively indicate reporting of {CSI-RS 1}, {CSI-RS 3} and {CSI-RS 1, CSI-RS 3, CSI-RS 4}. That is, the CSI request field is interpreted differently according to CSI subframe set. Here, meaning of each state of the CSI request field may be configured through RRC signaling and used. When RRC reconfiguration occurs, a specific field value may be configured such that the specific field value indicates reporting of all corresponding CSI-RS configuration sets in order to determine a time when the CSI request field is interpreted by applying the aforementioned signaling thereto. For example, a CSI request field value of 11 can indicate reporting of all CSI configuration sets all the time.

Distinguished from the above description, the CSI request field may be configured to request CSI report for a desired CSI-RS configuration set irrespective of a subframe in which a PDCCH is transmitted. For example, a CSI request field value of 00 can indicate no CSI reporting, 01 can indicate CSI reporting for the CSI configuration set S0, 10 can indicate CSI reporting for the CSI configuration set S1 and 11 can indicate reporting of all CSI configuration sets. This signaling may be limited to a UE-specific search space.

When a plurality of CSI-RS configuration sets is configured for a specific UE, as described above, a feedback resource and a container for a CSI-RS may be allocated/configured. That is, in periodic CSI reporting, a plurality of resources for feedback can be allocated. Since CSI-RS configuration sets may have different sizes and different numbers of antenna ports and different transmission modes may be configured for respective CSI subframe sets, different codebooks referred to by a UE for CSI feedback and different CoMP schemes for CSI subframe sets may be used. In addition, a CSI feedback period may be configured according to subframe set size. For example, CSI feedback can be performed more frequently as the subframe set size increases for improvement of CSI accuracy and system throughput. That is, an eNB can set a plurality of periodic CSI feedbacks for one UE. Here, a feedback resource and period can be configured per CSI feedback.

Furthermore, reference resources of PUCCH feedback and PUSCH feedback may differ. Periodic CSI feedback is generally transmitted through a PUCCH on uplink. Additionally desired CSI other than a PUCCH feedback may be transmitted through a PUSCH. When the PUSCH is used, a larger amount of information can be transmitted. Accordingly, different reference resources can be configured for PUCCH feedback and PUSCH feedback due to a difference between the quantities of resources that can be simultaneously transmitted through the PUCCH and PUSCH. Referring back to FIG. 10, in the case of PUCCH feedback, feedback may be performed only for CSI-RS 1 and CSI-RS 2. In the case of PUSCH feedback, feedbacks may be simultaneously performed for both CSI-RS 1 and CSI-RS 2. Otherwise, feedback may be performed only for CSI-RS 1 through the PUCCH all the time and feedback may be performed for both CSI-RS 1 and CSI-RS 2 using the PUSCH. Furthermore, different CSI measurement sets for CoMP feedback may be respectively set for the PUCCH and the PUSCH.

When CSI subframe sets for restricted measurement are configured for a UE, as described above, interference measurement may be individually performed only in each CSI subframe set and thus two different CQIs can be calculated for CSI subframe sets. In addition, a CSI subframe set specific interference measurement RE can be allocated. The CSI subframe set specific interference measurement RE is referred to as an interference measurement resource (IMR). A description will be given of interference measurement using the IMR.

A ZP CSI-RS will now be described first. A ZP CSI-RS configuration is included in a 'CSI-RS-Config-r10' message along with a non-ZP CSI-RS configuration and transmitted through RRC signaling, as shown in Table 5. Furthermore, the ZP CSI-RS configuration indicates a transmission period and subframe offset of the corresponding ZP CSI-RS through $I_{CSI-RS}$ corresponding to the above-described table 2 according to a 'zeroTxPowerSubframeConfig-r10' message, and an RE position in a subframe is signaled by 'zeroTxPowerResourceConfigList-r10' message represented by a 16-bit bitmap.

TABLE 5

```
-- ASN1START
CSI-RS-Config-r10 ::=        SEQUENCE {
    csi-RS-r10                                  CHOICE {
        ...
    }                OPTIONAL,                  -- Need ON
    zeroTxPowerCSI-RS-r10        CHOICE {
        release                                 NULL,
        setup                                   SEQUENCE {
            zeroTxPowerResourceConfigList-r10       BIT STRING (SIZE (16)),
            zeroTxPowerSubframeConfig-r10           INTEGER (0 . . . 154)
        }
    }                OPTIONAL                   -- Need ON
}
-- ASN1STOP
```

The IMR may be configured for all/some resources from among the aforementioned ZP CSI-RS. Otherwise, a separate resource may be configured irrespective of the ZP CSI-RS and signaled to a UE in a manner similar to CSI-RS signaling. As to specific IMR configuration, 'anHere, 'antennaPortsCount' for IMR configuration represents the numbertennaPortsCount', 'resourceConfig' and 'subframeConfig' may be indicated. of REs per RB, which correspond to one IMR configuration, 'resourceConfig' indicates an RE position and 'SubframeConfig' indicates a transmission period and offset of the IMR in the time domain.

When an IMR is configured for a UE, the UE can use the IMR for interference measurement. Interference measurement using the IMR may be an average of interferences measured for all IMRs set for the entire interval. However, when restricted measurement is configured, that is, measurement is instructed to be performed in different interference environments, and an IMR is configured for a corresponding UE for interference measurement, the UE can average measured interferences only in the same interference environment for measurement of identical interferences.

Figure 11:
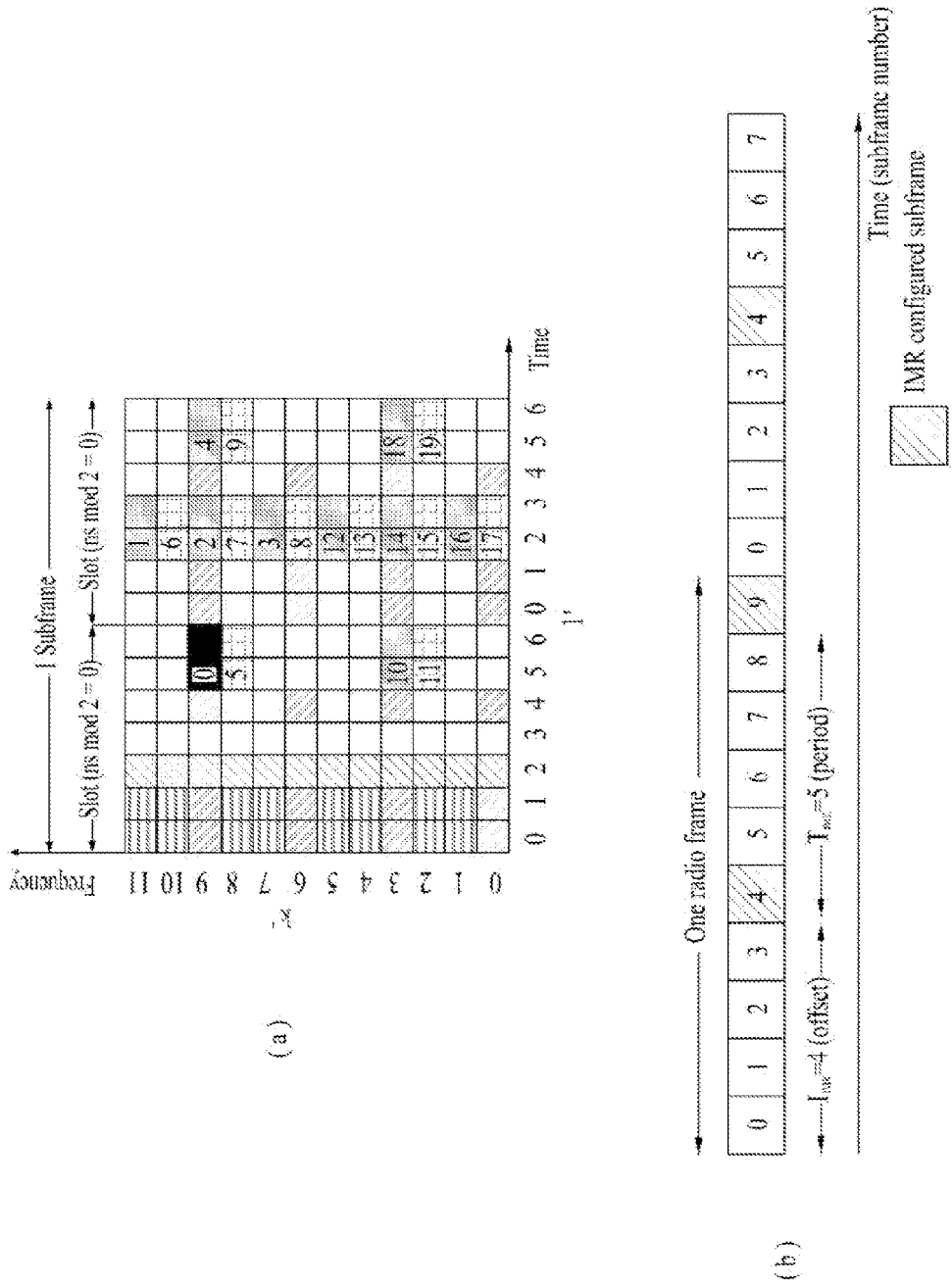
FIGS. 11, 12 and 13 illustrate interference measurement according to an embodiment of the present invention.
Figure 12:
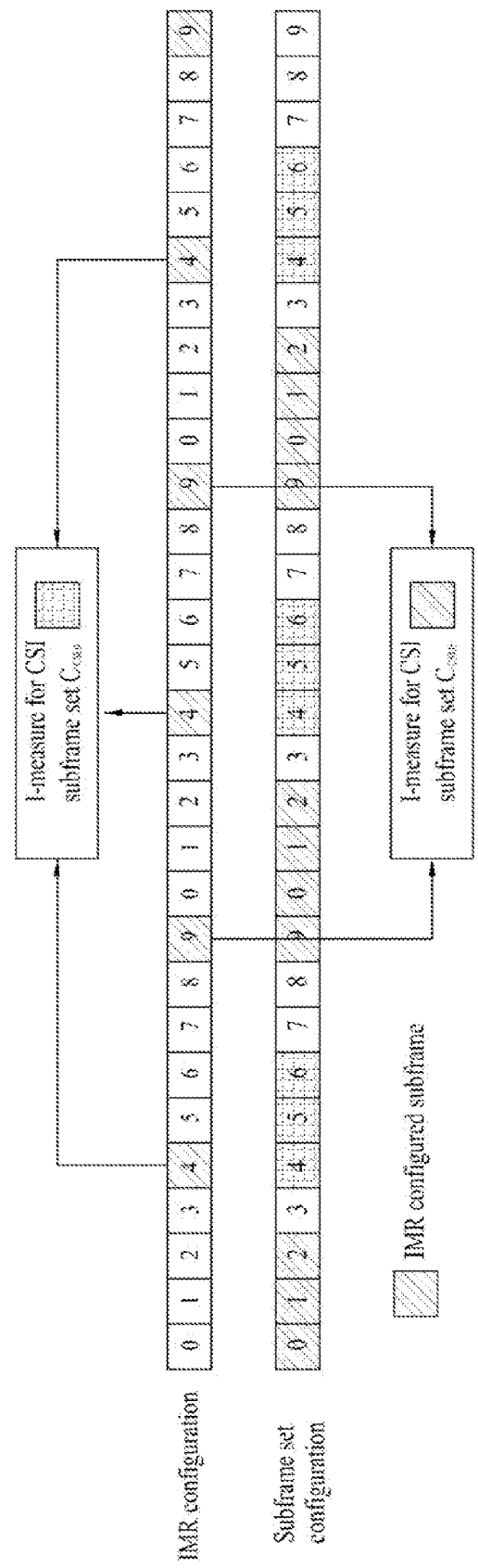
Figure 13:
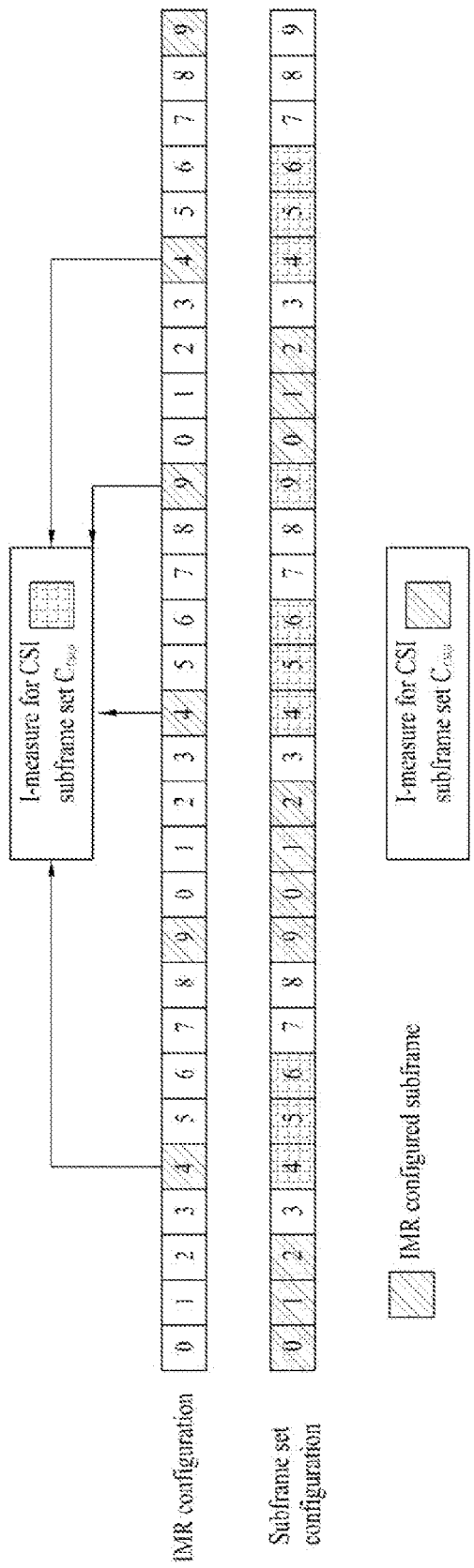

An example of interference measurement using an IMR in a UE for which restricted measurement is configured will now be described with reference to FIGS. 11, 12 and 13. FIGS. 11, 12 and 13 show a case in which the CSI subframe sets C0 and C1 are configured for the UE and a single IMR is configured for interference measurement.

FIG. 11 illustrates an exemplary resource configuration for interference measurement. Specifically, when zeroTxPowerAntennaPortsCount=ant2, zeroTxPowerResourceConfig=0, and zeroTxPowerSubframeConfig=4 in an IMR configuration as shown in Table 6, RE positions correspond to hatched portions of FIG. 11(*a*) and IMR configured subframes correspond to shaded portions of FIG. 11(*b*). FIG. 12 simultaneously illustrates IMR configuration and CSI subframe configuration as shown in FIG. 11. In FIG. 12, subframes #4, #5 and #6 correspond to the CSI subframe set C0 and subframes #0, #1, #2 and #9 correspond to the CSI subframe set C1. In this case, interference measurement can be performed per CSI subframe set, as described above. Specifically, interference measurement for the CSI subframe set C0 may be performed in such a manner that values measured for every subframe #4 corresponding to the CSI subframe set C0, from among the IMR configured subframes, are averaged. In addition, interference measurement for the CSI subframe set C1 may be performed in such a manner that values measured for every subframe #9 are averaged.

FIG. 13 shows a case in which the IMR is not configured in a specific CSI subframe set. Specifically, while the UE can perform interference measurement for the CSI subframe set C0 in subframes #4, #4, #9 and #4 which correspond to IMR configured subframes and the CSI subframe set C0, the CSI subframe set C1 does not include a subframe in which the IMR is transmitted.

In this case, the UE can drop CSI report for the CSI subframe set C1 as a solution. When the UE continuously drops CSI report for a specific CSI subframe set even though the eNB instructs the UE to perform CSI reporting, the eNB can reconfigure an IMR and/or a CSI subframe set upon determining that IMR configuration in a specific subframe has a problem. Specifically, when a UE for which restricted measurement is configured is instructed to report CSI about one or more CSI subframe sets, allocated an IMR configuration and instructed to measure interference using an IMR, if a specific subframe set does not include the IMR, then the UE can drop CSI report for the specific subframe set. That is, only CSI about a CSI subframe set including the IMR is reported and CSI about a CSI subframe set including no IMR is dropped.

As a second solution, it can be configured such that a CQI value corresponding to "out of range" from among CQI values is reported for a CSI subframe set that does not include the IMR.

A third solution is to measure interference using a CRS for a CSI subframe set that does not include the IMR. That is, the eNB can configure an IMR such that the IMR is included only in a specific CSI subframe set such that a specific UE can measure interference using a CRS.

When the IMR does not belong to any of a plurality of subframe sets, an interference measurement value using the IMR in a corresponding subframe may be regarded as an invalid value and may not be used.

In the above description, when CSI subframe sets are configured, that is, when restricted measurement is configured for the UE, a resource for measuring/reporting a signal and/or interference is independently determined per CSI subframe set. (Here, the resource for measuring/reporting a signal and/or interference may be the aforementioned CSI-RS configuration 1, a non-zero power CSI-RS configuration and a zero power CSI-RS configuration, or a non-zero power CSI-RS configuration and IMR configuration, for example, and is referred to as a CSI resource hereinafter. That is, the CSI resource can be considered to relate to a resource for signal measurement and a resource for interference measurement.) In other words, when a plurality of CSI resources is present and restricted measurement is configured, the CSI resources may be determined on the basis of a CSI subframe set.

On the contrary, when CSI subframe sets are configured, that is, when restricted measurement is configured for a UE, the CSI subframe sets can be configured on the basis of CSI resources. That is, CSI subframe sets (e.g. C0 and C1) for restricted measurement may be individually configured per CSI resource (CSI-RS resource). In other words, when a plurality of CSI resources is configured, the CSI subframe sets may be configured per CSI resource. That is, the CSI subframe sets can be independently or individually configured per CSI resource.

For example, CSI subframe sets C01 and C11 can be configured for CSI resource 1 and CSI subframe sets C02 and C12 can be configured for CSI resource 2. Here, the CSI subframe sets C01 and C02 may be subframe sets partially/entirely identical to each other or different subframe sets. In addition, the CSI subframe sets C11 and C12 may be subframe sets partially/entirely identical to each other or different subframe sets. Otherwise, a CSI subframe set may not be configured for CSI resource 1 and CSI subframe sets C0 and C1 may be configured for CSI resource 2.

In a method proposed by the present invention, in the case of a UE performing CoMP in a network for which restricted measurement is configured, when CSI reference resources of a time-frequency resource region for channel state estimation/calculation are segmented into a plurality of resource sets, the eNB independently determines a CSI report set, which needs to be reported by the UE, per resource set. The UE is assigned a CSI report set (CSI-RS resource set) individually set per resource set, calculates CSI to be reported by considering signal reception quality from a corresponding CSI-RS and a resource set reception environment and feeds back the CSI to the eNB. Here, the same CSI-RS resource may belong to a plurality of CSI report sets.

In a modified method proposed by the present invention, the eNB may configure a plurality of interference measurement resources and independently determine a CSI report set per interference measurement resource. The UE is assigned a CSI report set individually configured per interference measurement resource and may calculate CSI to be reported by considering signal reception quality from a corresponding CSI-RS and an interference environment of interference measurement resources and feed back the CSI to the eNB. That is, one interference measurement resource is assigned to the UE for each CSI report set. Here, the same CSI-RS resource may belong to a plurality of CSI report sets.

While a plurality of elements such as 'CSI-RS config' (e.g. csi-RS-r10) can be repeatedly signaled to UEs to indicate CSI-RS positions when a plurality of CSI-RS resources is configured, as described above, a CSI-RS resource signaled to one UE may be divided and used by a plurality of transmission points in order to reduce signaling overhead with respect to UEs.

For example, when two transmission points each having 4 Tx antenna ports perform downlink CoMP, one 8-port CSI-RS in the form of an 8-port CSI-RS set is signaled to a UE. That is, a plurality of transmission points can signal only one CSI-RS resource to the UE and share the CSI-RS resource (the UE cannot be aware of how many transmission points share the CSI-RS resource). Here, one CSI-RS resource may be 'csi-RS-r10' shown in Table 4 and may include the number of antenna ports, CSI-RS configuration, subframe configuration or Pc represented by 'PDSCH-EPRE(energy per RE) to CSI-RS-EPRE'. Sharing one CSI-RS resource/configuration by a plurality of transmission points can be represented by "TP-shared CSI-RS configuration". Accordingly, according to the conventional CSI-RS configuration, 'PDSCH-EPRE to CSI-RS-EPRE', that is, Pc in one CSI-RS resource can have only one value.

Downlink transmission power allocation in association with Pc will now be briefly described. A reference value is EPRE for a CRS and CRS EPRE is determined through a higher layer signal and has a fixed value in a downlink system bandwidth and subframe. EPRE for PDSCH resources can be represented as a predetermined ratio to CRS EPRE. For example, the ratio of CRS EPRE to PDSCH EPRE is defined as $\rho_A$ in an OFDM symbol including no CRS and defined as $\rho_B$ in an OFDN symbol including a CRS. $\rho_A$ is determined by power offset $\delta_{power-offset}$ according to whether MIMO is applied and a UE-specific parameter $P_A$ and $\rho_B/\rho_A$ is determined by the number of antenna ports and a cell-specific parameter $P_B$. A UE uses $P_A$ and $P_B$, received through a higher layer signal for data demodulation and CSI calculation.

This is shown in FIG. 14. FIG. 14 schematizes $\rho_A$ and $\rho_B$ for a normal subframe (FIG. 14(a)) and an ABS subframe (FIG. 14(b)) in a coordinate system in which the horizontal axis represents OFDM symbol, the vertical axis represents subcarrier and height axis represents power.

As to FIG. 14(b), the aforementioned ABS structure may have a zero power ABS (z-ABS) structure in which a reference signal (e.g. CRS) for legacy UEs that cannot recognize the ABS structure and system information (e.g. PBCH, SIB, PSS and SSS) are transmitted and other signals such as data are not transmitted or a reduced power ABS (r-ABS) structure in which data is transmitted with very low transmission power. Even when a serving macro eNB uses the ABS for a pico eNB, a UE served by the macro eNB cannot be aware of information about the ABS and need not know the information because the ABS defined in LTE-A release-10 is a z-ABS which is a subframe in which the eNB does not attempt to schedule uplink/downlink unicast data or attempts restricted scheduling. (Restricted scheduling intention of a transmission point in a z-ABS means that downlink scheduling may be performed in the corresponding subframe using only QPSK that enables data demodulation without knowing a power level since the power level is not signaled.) In the case of r-ABS, however, a transmission point intends to schedule unicast data in the corresponding subframe. Accordingly, when a macro eNB schedules a macro UE in the r-ABS, the macro UE needs to know transmission power information of the transmission point in order to demodulate a PDSCH transmitted from the transmission point and calculate CSI. To this end, values such as $P_A$, $P_B$ and Pc in the r-ABS need to be additionally signaled to the UE as parameters indicating transmission power of the transmission point in the r-ABS.

Figure 15:
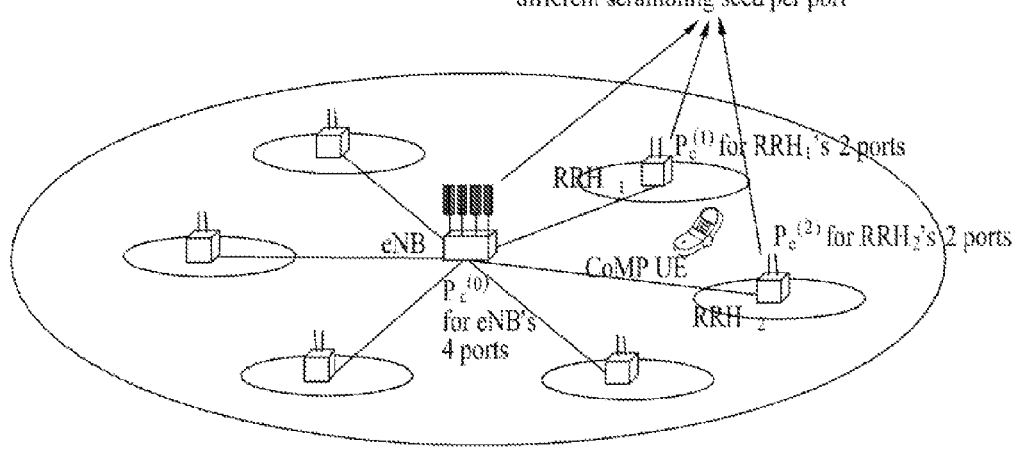

Considering that a boosting degree of CSI-RS ERPE (Energy Per Resource Element) may differ from that of PDSCH EPRE for a specific antenna port, Pc may be independently designated per antenna port when the eNB signals a CSI-RS configuration to a specific UE such that Pc can be reflected in CQI calculation and the like. FIG. 15 illustrates an example of applying the method of differently setting Pc per antenna port.

FIG. 15 shows a case in which a macro eNB transmits an 8-CSI-RS port CSI-RS configuration to UEs in a CoMP environment. 4 of 8 CSI-RS ports may correspond to the transmission point which is the macro eNB and 2 CSI-RS ports thereof may correspond to RRH1 and the remaining 2 CSI-RS ports may correspond to RRH2. A corresponding relationship between a specific port and a transmission port is configured transparently for the UE, and thus the UE may not be aware of the corresponding relationship. That is, while the UE operates to perform measurement for 8 CSI-RS ports signaled thereto through the CSI-RS configuration, the UE may not know a transmission point to which a specific port corresponds.

To increase CoMP gain of the UE, when the transmission point and RRHs, which are geographically separated, are grouped and configured as one CSI-RS configuration (or in various cases in which multiple transmission points are grouped and set as one CSI-RS configuration in HetNet situation, such as a case in which the macro-transmission point and pico-transmission points are grouped and configured as one CSI-RS configuration), different Pc values may be configured for respective ports such that boosting degrees of CSI-RS EPRE from the ports are different, compared to PDSCH EPRE. The UE can apply the different Pc values to CSI feedback calculation, that is, determination of RI/PMI/CQI. The method for setting Pc per antenna port may be referred to as "per port Pc setting".

A description will be given of a method for configuring CSI-RSs for a plurality of transmission points when a plurality of Pc values is signaled for one CSI-RS resource/configuration instead of Pc setting/signaling per antenna port for all CSI-RS antenna ports constituting one CSI-RS resource/configuration, in association with "per port Pc setting". Here, it is assumed that a CSI-RS transmission power level is maintained in all time/frequency resource regions.

When PDSCH transmission power is changed in a specific time/frequency resource region, a PDSCH EPRE to CSI-RS EPRE ratio for the corresponding resource region needs to be configured/signaled for CSI feedback of a UE. That is, when Pc is not signaled per antenna port in one CSI-RS resource/configuration and PDSCH EPRE to CSI-RS EPRE ratio (Pc) is configured per CSI-RS resource, and PDSCH EPRE to CSI-RS EPRE ratio is configured per antenna port or per transmission point, which is limited to a specific time/frequency resource region, one CSI-RS resource/configuration can be shared by only antenna ports or transmission points which have the same PDSCH EPRE to CSI-RS EPRE ratio in the specific time/frequency resource region.

Referring to FIG. 16, when a macro eNB in a CoMP environment, as shown in FIG. 16(a), operates ABS, PDSCH EPRE to CSI-RS EPRE ratios of normal subframes (subframes #0, #1, #4, #7, #8 and #9 in FIG. 16(b)) and ABSs (subframes #2, #3, #5 and #6 in FIG. 16(b)) need to be signaled. However, a pico eNB that does not use the ABS need not signal a plurality of PDSCH EPRE to CSI-RS EPRE ratios since PDSCH transmission power thereof is not changed. Accordingly, even when the macro eNB and the pico eNB perform downlink CoMP, the two eNBs cannot share one CSI-RS resource/configuration. In this case, the CSI-RS cannot be configured for the macro eNB and the pico eNB.

When Pc per antenna port in one CSI-RS resource is not signaled and a PDSCH EPRE to CSI-RS EPRE ratio (Pc) is configured per CSI-RS resource, all antenna ports or eNBs can share the CSI-RS resource/configuration only when the antenna ports or eNBs have the same ABS configuration. For example, when two macro eNBs Macro eNB 1 and Macro eNB 2 have different ABS configurations as shown in FIG. 17(b) in a CoMP environment as shown in FIG. 17(a), the two macro eNBs Macro eNB 1 and Macro eNB 2 cannot share a CSI-RS resource/configuration.

When Pc per antenna port in one CSI-RS resource is not signaled and a PDSCH EPRE to CSI-RS EPRE ratio (Pc) is configured per CSI-RS resource, all antenna ports or eNBs can share a CSI-RS resource/configuration only when the antenna ports or eNBs have the same PDSCH EPRE to (CSI-)RS EPRE ratio and the same ratio pattern.

When Pc per antenna port in one CSI-RS resource is not signaled in one CSI-RS resource and a PDSCH EPRE to CSI-RS EPRE ratio (Pc) is configured per CSI-RS resource, a plurality of PDSCH EPRE to CSI-RS EPRE ratios (Pc) can be configured for one CSI-RS resource/configuration only when all antenna ports or eNBs sharing one CSI-RS resource/configuration have the same ABS configuration.

Particularly, when a macro eNB uses the ABS, and Pc in a normal subframe other than the ABS and Pc' ($P'_c \neq 0$) in the ABS are transmitted to a UE, one CSI-RS resource/configuration cannot be configured for eNBs each of which has different reference signal to data transmission power ratios according to time. In this case, one CSI-RS resource cannot be shared by antenna ports or eNBs having different PDSCH EPRE to CSI-RS EPRE ratios. Only when $P'_c=0$, that is, when the macro eNB does not schedule unicast data in an ABS (zero-power ABS), a CSI-RS resource can be shared by the macro eNB and a pico eNB. Only when CSI-RS antenna ports have the same PDSCH EPRE to CSI-RS EPRE ratio, the corresponding CSI-RS can be configured for a plurality of physically separated eNBs. Otherwise, when Pc can be configured per antenna port, one CSI-RS resource can be configured for a plurality of eNBs.

That is, transmission points having different PDSCH EPRE to CSI-RS EPRE ratios cannot share a CSI-RS resource/configuration and transmission points having different numbers of PDSCH EPRE to CSI-RS EPRE value cannot share a CSI-RS resource/configuration. In other words, transmission points or antenna ports having the same PDSCH EPRE to CSI-RS EPRE ratio can share a CSI-RS resource/configuration. When a plurality of PDSCH EPRE to CSI-RS EPRE ratios is configured, transmission points or antenna ports can share a CSI-RS resource/configuration only when the transmission points or antenna ports have the same PDSCH EPRE to CSI-RS EPRE value and the same number of PDSCH EPRE to CSI-RS EPRE. Even when a plurality of Pc values is configured, a UE that has received one CSI-RS resource/configuration needs to assume that all antenna ports with respect to the corresponding CSI-RS are related to one transmission point. Even when one CSI-RS is configured for a plurality of transmission points, the UE can assume that a CSI-RS per port is transmitted from one transmission point. Assuming transmission points as one transmission point means assuming that the transmission points are co-located or all antenna ports have the same timing reference, the same frequency offset and the same virtual cell ID.

In the case of downlink CoMP, a CSI-RS can be configured per transmission point or per CoMP scheme such that a UE can receive a plurality of CSI-RS configurations for correct measurement of CSI from each transmission point. In this case, a PDSCH EPRE to CSI-RS EPRE ratio may be configured per CSI-RS resource. In addition, since a specific transmission point changes PDSCH transmission power in a specific time/frequency resource region, a PDSCH EPRE to CSI-RS EPRE ratio for a corresponding resource can be configured/signaled for the transmission point. For example, when the UE receives a plurality of CSI-RS configurations for CSI measurement and an additional PDSCH EPRE to CSI-RS EPRE ratio, Pc', in subframes corresponding to ABSs is signaled since the transmission point operates the ABSs, the transmission point needs to signal a CSI-RS resource/configuration to which Pc' is applied. Furthermore, when the UE performs CSI feedback, particularly, in the case of restricted measurement, a CSI-RS which is fed back in consideration of Pc' needs to be configured because only transmission points having the same ABS pattern can share a CSI-RS resource/configuration when macro eNBs operating the ABS and pico eNBs that do not operate the ABS perform downlink CoMP operation.

In this case, macro eNBs can share one CSI-RS resource/configuration and pico eNBs can share another CSI-RS resource/configuration. According to ABS operation of macro eNBs, restricted measurement is configured for the UE and two or more measurement subframe sets can be assigned to the UE per transmission point or per CSI-RS resource configuration for restricted measurement. Preferably, a plurality of measurement subframe sets needs to be configured for the UE per CSI-RS resource configuration in an environment in which CoMP and FeICIC are combined. In this case, a PDSCH EPRE to CSI-RS EPRE ratio (Pc) needs to be mapped or signaled per measurement subframe set.

Alternatively, even when a plurality of CSI-RS resources is configured for transmission points cooperating in downlink CoMP, two common measurement subframe sets can be configured for all cooperating transmission points. In this case, when an additional PDSCH EPRE to CSI-RS EPRE ratio (Pc) is signaled/set due to operation of the ABS, a CSI-RS resource/configuration for which the UE needs to assume the PDSCH EPRE to CSI-RS EPRE ratio (Pc) during CSI feedback can be indicated.

Figure 18:
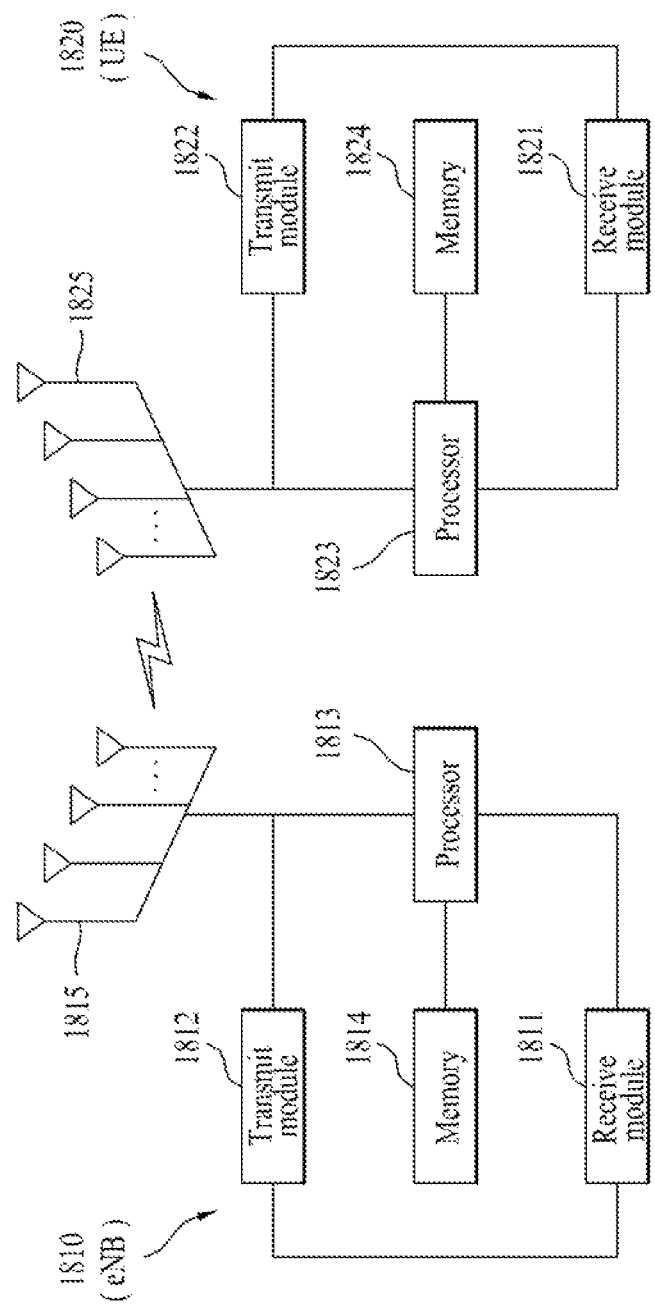
FIG. 18 illustrates a configuration of a transceiver.

FIG. 18 illustrates configurations of a transmission point apparatus and a UE apparatus according to an embodiment of the present invention.

Referring to FIG. 18, the transmission point apparatus 1810 according to the present invention may include a reception module 1811, a transmission module 1812, a processor 1813, a memory 1814 and a plurality of antennas 1815. The antennas 1815 are used for a transmission point supporting MIMO transmission and reception. The reception module 1811 may receive various signals, data and information on uplink from a UE. The transmission module 1812 may transmit various signals, data and information on downlink to the UE. The processor 1813 can control the overall operation of the transmission point apparatus 1810.

The processor 1813 of the transmission point apparatus 1810 according to an embodiment of the present invention may operate to perform the aforementioned embodiments.

The processor 1813 of the transmission point apparatus 1810 may execute a function of processing information received by the transmission point apparatus 1810, information transmitted to the outside and the like. The memory 1814 may store processed information for a predetermined time and may be replaced by a component such as a buffer (not shown).

Referring to FIG. 18, the UE apparatus 1820 according to the present invention may include a reception module 1821, a transmission module 1822, a processor 1823, a memory 1824 and a plurality of antennas 1825. The antennas 1825 are used for a UE supporting MIMO transmission and reception. The reception module 1821 may receive various signals, data and information on uplink from a transmission point. The transmission module 1822 may transmit various signals, data and information on downlink to the transmission point. The processor 1823 can control the overall operation of the UE apparatus 1820.

The processor 1823 of the UE apparatus 1820 according to an embodiment of the present invention may operate to perform the aforementioned embodiments.

The processor 1823 of the UE apparatus 1820 may execute a function of processing information received by the UE apparatus 1810, information transmitted to the outside and the like. The memory 1824 may store processed information for a predetermined time and may be replaced by a component such as a buffer (not shown).

The aforementioned configurations of the transmission point apparatus and the UE apparatus may be implemented such that the above-described embodiments of the present invention can be independently applied or two or more thereof can be simultaneously applied, and description of redundant parts is omitted for clarity.

In addition, description of the transmission point apparatus 1810 in FIG. 18 may be equally applied to a relay as a downlink transmission entity or an uplink reception entity and description of the UE apparatus 1820 may be equally applied to a relay as a downlink reception entity or an uplink transmission entity The embodiments of the present invention may be achieved by various means, for example, hardware, firmware, software, or a combination thereof.

In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described with reference to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention can be applied to various mobile communication systems.

The invention claimed is:

1. A method for transmitting, by a user equipment (UE), channel state information (CSI) for a plurality of transmission points (TPs) configured to perform cooperative transmission for the UE in a wireless communication system, the method comprising:
receiving configuration information for a first and a second CSI subframe sets and for interference measurement resource (IMR) from one of the plurality of TPs, wherein the IMR is not configured in the second CSI subframe set;
calculating a channel quality indicator (CQI) value for the first CSI subframe set by using the IMR;
transmitting only a CSI for the first CSI subframe set including the CQI value to the one of the plurality of TPs; and
receiving, in response to the transmission of the CSI, re-configuration information for at least one of the first and the second CSI subframe sets and the IMR from the one of the plurality of TPs.

2. The method according to claim 1, further comprising:
wherein the transmitting comprises dropping a CSI for the second CSI subframe set.

3. A method for receiving, by a transmission point (TP) among a plurality of TPs configured to perform cooperative transmission for a user equipment (UE), channel state information (CSI) in a wireless communication system, the method comprising:
transmitting configuration information for a first and a second CSI subframe sets and for interference measurement resource (IMR) to the UE, wherein the IMR is not configured in the second CSI subframe set; and
receiving only a CSI for the first CSI subframe set including a channel quality indicator (CQI) value calculated for the first CSI subframe set from the UE; and
transmitting, in response to the reception of the CSI, re-configuration information for at least one of the first and the second CSI subframe sets and the IMR to the UE.

4. A user equipment (UE) configured to transmit channel state information (CSI) for a plurality of transmission points (TPs) configured to perform cooperative transmission for the UE in a wireless communication system, the UE comprising:
a radio frequency (RF) antenna; and
a processor,
wherein the processor is configured to:
control the RF antenna to receive configuration information for a first and a second CSI subframe sets and for interference measurement resource (IMR) from one of the plurality of TPs, wherein the IMR is not configured in the second CSI subframe set;
calculate a channel quality indicator (CQI) value for the first CSI subframe set by using the IMR;
control the RF antenna to transmit only a CSI for the first CSI subframe set including the CQI value to the one of the plurality of TPs; and
control the RF antenna to receive, in response to the transmission of the CSI, re-configuration information for at least one of the first and the second CSI subframe sets and the IMR from the one of the plurality of TPs.

5. A transmission point (TP) configured to receive channel state information (CSI) in a wireless communication system, the TP comprising:
a radio frequency (RF) antenna; and
a processor, wherein the processor is configured to:

control the RF antenna to transmit configuration information for a first and a second CSI subframe sets and for interference measurement resource (IMR) to the UE, wherein the IMR is not configured in the second CSI subframe set;

control the RF antenna to receive only a CSI for the first CSI subframe set including a channel quality indicator (CQI) value calculated for the first CSI subframe set from the UE; and control the RF antenna to transmit, in response to the reception of the CSI, re-configuration information for at least one of the first and the second CSI subframe sets and the IMR to the UE.

* * * * *